(12) United States Patent
Pudewills et al.

(10) Patent No.: US 12,128,549 B2
(45) Date of Patent: Oct. 29, 2024

(54) HANDLING DEVICE FOR REPOSITIONING OBJECTS

(71) Applicant: Festo SE & Co. KG, Esslingen (DE)

(72) Inventors: Leif Pudewills, Esslingen (DE); Markus Singer, Plochingen (DE); Tobias Waibel, Ostfildern (DE); Manuel Schön, Stuttgart (DE); Ulrich Müller-Boysen, Esslingen (DE)

(73) Assignee: Festo SE & Co. KG, Esslingen (DE)

( * ) Notice: Subject to any disclaimer, the term of this patent is extended or adjusted under 35 U.S.C. 154(b) by 889 days.

(21) Appl. No.: 17/279,949

(22) PCT Filed: Sep. 5, 2019

(86) PCT No.: PCT/EP2019/073710
§ 371 (c)(1),
(2) Date: Mar. 25, 2021

(87) PCT Pub. No.: WO2020/064293
PCT Pub. Date: Apr. 2, 2020

(65) Prior Publication Data
US 2022/0032474 A1 Feb. 3, 2022

(30) Foreign Application Priority Data

Sep. 26, 2018 (DE) ...................... 10 2018 216 393.6

(51) Int. Cl.
*B25J 15/00* (2006.01)
*B65G 47/90* (2006.01)

(52) U.S. Cl.
CPC ............ *B25J 15/008* (2013.01); *B65G 47/90* (2013.01)

(58) Field of Classification Search
CPC ...... B25J 15/008; B65G 47/90; B65G 47/907; B65G 2207/02; B65H 3/20; B65H 2301/44335
(Continued)

(56) References Cited

U.S. PATENT DOCUMENTS 2,600,068 A * 6/1952 Meyers .................... B65H 3/20
294/212
3,857,560 A * 12/1974 Gundlach .............. B65H 29/56
271/900

(Continued)

FOREIGN PATENT DOCUMENTS

DE 1135738 B 8/1962
DE 3523415 A * 1/1987 ........... B65B 43/165

(Continued)

*Primary Examiner* — Dean J Kramer
(74) *Attorney, Agent, or Firm* — Hoffmann & Baron, LLP

(57) ABSTRACT

A handling device which is suitable for repositioning objects has an adhesive gripping device which includes a support structure on which at least one gripping unit is arranged. The gripping unit has an adhesive belt which extends between two holding regions and which, in a working region having a longitudinal portion functioning as a gripping portion, is wound around a release deflection element which is translationally movable relative to the support structure. The release deflection element is part of a release system, by means of which adherence of the object can be released again as required. This release system also has a release drive system, by means of which a rotational movement of the gripping portion around the release deflection element, which movement accompanies the release movement, can be caused, leading to the active removal of the adhesive belt from the gripped object.

27 Claims, 18 Drawing Sheets

(58) Field of Classification Search
USPC .......................................................... 294/212
See application file for complete search history.

(56) References Cited

U.S. PATENT DOCUMENTS

| | | | |
|---|---|---|---|
| 4,591,139 A * | 5/1986 | Engelbart | B65H 3/20 |
| | | | 271/145 |
| 4,887,858 A | 12/1989 | Gazzarrini | |
| 9,181,052 B2 * | 11/2015 | Lu | B65H 5/068 |

FOREIGN PATENT DOCUMENTS

| | | |
|---|---|---|
| DE | 102012001095 B4 | 3/2014 |
| EP | 0388398 A2 | 9/1990 |
| JP | S62249836 A | 10/1987 |
| JP | 2001315981 A | 11/2001 |

* cited by examiner

HANDLING DEVICE FOR REPOSITIONING OBJECTS

This application claims priority based on an International Application filed under the Patent Cooperation Treaty, PCT/EP2019/073710, filed on Sep. 5, 2019, which claims priority to DE 10 2018 216 393.6, filed Sep. 26, 2018.

BACKGROUND OF THE INVENTION

The invention relates to a handling device for repositioning objects, with an adhesion gripping device which comprises a support structure, on which a fastening interface for fastening the adhesion gripping device to a positioning device is formed, by way of which positioning device the adhesion gripping device is movable and positionable whilst carrying out a handing movement, with at least one gripping unit which is arranged on the support structure and which comprises a supple adhesion tape which extends in a main plane of the adhesion gripping device between two holding regions which are distanced to one another, at least on one side comprises an adhesion surface and has a longitudinal section, said longitudinal section being passed through a working region of the gripping unit and forming a gripping section, by way of which an object to be repositioned can be gripped and firmly held in a releasable manner in the working region by way of the adhesion action of the adhesion surface.

A handling device of this type which is known from U.S. Pat. No. 4,887,858 comprises an adhesion gripping device with an adhesion tape which at two holding regions which are distanced to one another is wound on a winding roller and is led through a working region amid the deflection about two deflection rollers. The longitudinal section of the adhesion tape which extends in the working region forms a gripping section which is in the position of gripping supple, air-permeable objects and temporarily holding them in a firm manner for the purpose of singularisation. A tape transport drive unit, by way of which a discontinuous transport movement of the adhesion tape can be produced when the gripping section which is momentarily in use is consumed on account of contamination, is assigned to the winding rollers. A block with air exit nozzles is located in the working region, through which nozzles pressurised air which can pass through the momentarily firmly held object in order to separate it from the object lying therebelow can be blown out.

A device for removing extensive workpieces from an adhering sub-foil is described in EP 0 388 398 A2. The device comprises an adhesion gripping device which is provided with an adhesive foil which runs around two winding drums. The adhesive foil can be driven into a circulating movement about the winding drums, in order to deposit the workpiece which adheres to it. With regard to this deposition procedure, a relative movement of the complete adhesion gripping device with respect to the workpiece which is firmly held in another manner takes place.

A gripping device which is known from DE 10 2012 001 095 B4 has a contact section, on which an adhesion element is arranged, said adhesion element with the help of the contact section being pressable onto an object to be gripped. The object which is firmly held by way of the adhesion effect can be put down again when required, by way of a shape change of the contact section including the adhesion element which is attached thereto being created by a setting device.

A handling device which is known from JP 2001-315 981 A has a support structure which can be driven into a vertical pivoting movement and on which a wind-off roller and a wind-up roller are seated, between which rollers an adhesion tape extends, said adhesion tape also yet being led with a gripping section around a pressing roller. An object to be repositioned can adhere to the gripping section. The pressing roller is rotatably seated on a carrier shaft which is fastened to the support structure, so that it participates in the pivoting movement of the support structure. The pressing roller is seated in a housing-like pressing element which is movable relative to the pressing roller by way of an actuation magnet and is biased to the bottom by way of a spring. For detaching the object, the previously activated actuation magnet is deactivated, so that by way of the force of the spring the pressing element moves downwards relative to the pressing roller and presses the object away from the adhesion tape. Alternatively, the object for its detachment can firstly be pressed downwards onto a base by way of the pressing element, without pressing it away from the adhesion tape. The actual detachment is subsequently effected by way of the support structure together with the pressing roller being pivoted upwards relative to the pressing element which is firmly held by the spring.

A handling device which comprises an adhesion tape which runs between two winding rollers and which is wrapped around a guide roller functioning as a pressing roller can be derived from JP S62-249 836 A. The guide roller is rotatably mounted on a support structure which is movable up and down. The detachment of an object which adheres to the adhesion tape is effected by way of a separate release lever which is pivotable by way of a cylinder, in order to act upon the firmly held object from above and to press this away from the adhesion tape.

Concerning a handling device which is described in DE 11 35 738 A, an adhesive tape is wrapped around a multitude of deflection rollers, below which two adhesive carrier rollers which are arranged at the bottom are located. The longitudinal section of the adhesive tape which is momentarily wrapped around an adhesive carrier roller functions as a gripping section. For detaching an object which adheres to the gripping sections, an unlocking mechanism is actuated, by way of which a spring is actuated, so that the adhesive carrier rollers move upwards relative to a pressing plate, wherein the adhering object is held back by the pressing plate and is pressed away from the gripping sections.

SUMMARY OF THE INVENTION

It is the object of the invention to provide measures which given an adhesion gripping device which is provided with an adhesion tape, in particular favours a simple and reliable releasing of a previously gripped and firmly held object.

For achieving this object, in combination with the initially mentioned features, one envisages the adhesion gripping device comprising a release device which is designed for releasing an object gripped by the gripping section of the adhesion tape, said release device comprising at least one release deflection element which is arranged in the working region of the gripping unit, is partially wrapped by the adhesion tape and is translationally movable relative to the support structure in the main plane for carrying out a release movement, and further comprising a release drive unit which is arranged on the support structure and by way of which a circulating movement of the gripping section around the release deflection element can be created, said circulating movement being accompanied by the release movement of the release deflection element and effecting an active pulling-away of the adhesion tape from the gripped object.

The handling device according to the invention comprises an adhesion gripping device which comprises at least one gripping unit which is provided with an adhesion tape. A longitudinal section of the adhesion tape functions as a gripping section which extends in a working region of the gripping unit and by way of an adhesive effect is able to releasably firmly holding an object to be repositioned. The gripping unit is carried by a support structure of the adhesion gripping device which is provided with a fastening interface, via which the adhesion gripping device is attachable or attached to a positioning device, for example to the movable arm of a robot. By way of this, there exists the possibility of moving the adhesion gripping device including its gripping unit whilst carrying out a handling movement and herein spatially repositioning a firmly held object. Since the effect of the firm holding is based on an adhesive effect, not only can rigid, but also supple objects and even ones which are permeable to air be reliably gripped and firmly held. Herein, it is particular textiles which spring to mind. The release device which is additionally integrated into the adhesion gripping device permits a reliable release from the gripping section of the adhesion tape at the desired deposition position in accordance with requirements for every type of object. The release device comprises at least one release deflection element which is arranged in the working region of the gripping unit and which is partially wrapped around by the adhesion tape which extends between two holding regions which are distanced to one another. A particularity of the release deflection element lies in its translatory movability relative to the support structure in the extension plane of the adhesion tape which is denoted as a main plane. By way of this, a circulating movement of the gripping section of the adhesion tape around the release deflection element can be created by way of a release drive unit of the release device, said circulating movement being combined with a displacement movement of the release deflection element relative to the support structure, wherein this displacement movement is denoted as a release movement. This procedure causes an active pulling-away of the adhesion tape from the momentarily gripped object. With this release procedure, the gripping section in its longitudinal direction is gradually pulled away from the one side to the other and is hence quasi peeled away from the object which was hitherto firmly held. Objects to be repositioned can therefore be securely repositioned and reliably deposited again at the target position irrespectively of their structural constitution. The translationally release movement is preferably a linear movement, but can also be a non-linear movement, in particular a movement which follows an arc, preferably a circular arc.

Advantageous further developments of the invention are to be derived from the dependent claims.

Concerning the adhesion tape, it is preferably the case of an adhesive tape, in particular a self-adhesive tape whose adhesion surface is formed by a self-adhesive surface. The adhesive which is used form forming the self-adhesive surface can be selected in relation to the object. An adhesion tape with particularly well-suited, self-adhesive bonding characteristics can be used depending on the intrinsic type of the object to be handled. The use of a self-adhesive tape has the advantage that no adhesive needs to be deposited during the operation of the adhesion gripping device.

Alternatively, the adhesion tape can also be designed for example such that the adhesion effect is based on the so-called Van-der-Waals forces. Such adhesion forces can be realised for example by way of the adhesion tape being provided on the adhesion surface with a microstructure of discretely formed dollies, wherein the adhesion tape preferably consists of a carrier tape which is coated on one side with a silicon foil, wherein the silicon foil is provided with the microstructure. A corresponding design of an adhesive surface is described in the initially mentioned DE 10 2012 001 095 B4.

The adhesion tape can be firmly fixed on the support structure in both holding regions. If the gripping section is consumed or worn, then the adhesion tape is simper to exchange in this case. However, what is preferred is an embodiment concerning which the adhesion tape is rotatable in both holding regions each about a winding roller which is rotatable with respect to the support structure about a rotation axis which is at right angles to the main plane. One of these winding rollers forms a wind-off roller which provides the non-consumed adhesion tape, whereas the other winding roller functions as a wind-up roller which receives the consumed adhesion tape. If the gripping section is consumed, then a new gripping section can be very simply positioned in the working region by way of the adhesion tape being wound a little from the wind-off roller onto the wind-up roller.

In the context of the aforementioned winding rollers, the adhesion gripping device can be designed for a manual winding-over of the adhesion tape. For example, a hand actuation member which can be actuated with one hand, for example a hand crank can be coupled to the wind-up roller. An embodiment, concerning which each gripping unit, for winding over the adhesion tape from the wind-off roller onto the wind-up roller, has a tape transport drive unit which for example is actuatable electrically or way of fluid and by way of entering an actuation signal can be initiated into causing a transport movement of an adhesion tape for the continued cycling of the adhesion tape is seen as being more advantageous and above all more comfortable. The tape transport drive unit can be designed for the manual activation, for example by way of a suitable switch or also for the sensor-controlled or time-controlled actuation by way of an electronic control device of the handling device.

The release deflection element preferably comprises an arcuately bent deflecting surface which is wrapped by the adhesion tape. By way of this, given an object release procedure entailed by a relative movement between the gripping section and the release deflection element, an advantageous material conservation of the adhesion tape and accordingly a reduced wear results. The arc length which is wrapped by the adhesion tape preferably extends by less than 180°. The actual angle of wrap in particular depends on the leading of the adhesion tape which is released at the gripping unit.

The release deflection element can basically be a non-rotatable sliding element, on which the adhesion tape with its rear surface which is opposite to adhesion surface bears in a slidingly displaceable manner. Preferably, the release deflection element is however designed as a deflection roller which is rotatable relative to the support structure about a rotation axis which is at right angles to the main plane. The radially orientated outer peripheral surface of the release deflection element defines a deflection surface for the adhesion tape. Here, it is advantageous for the roller-shaped release deflection element to be able to roll with a low wear on the gripping section of the adhesion tape given its release movement and also given a possible transport movement of the adhesion tape.

Concerning a possible embodiment of the handling device, the adhesion gripping device comprises only a single gripping unit. Such a construction is recommended in particular for repositioning relatively small objects.

Concerning a likewise advantageous embodiment of the handling device, the adhesion gripping device is provided with several gripping units which are arranged on the support structure and which each comprise an individual working region, through which a gripping section of an adhesion tape is led and to which an individual release deflection element is assigned. Several gripping units can be arranged distributed for example in a pointwise meaner such that several working regions which lie in a common working plane result. Several gripping units are arranged for example distributed in a matrix-like manner. This favours the handling of large-surfaced objects. Preferably, the several gripping units can be operated in a manner coordinated to one another.

Concerning a preferred embodiment of the handling device, the adhesion gripping device is provided with two or an even greater number of gripping units which are arranged on the support structure and of which at least one gripping unit is displaceable and positionable relative to the support structure and to at least one further gripping unit. Herein, the working regions of the several gripping units expediently lie in a common working plane as was hitherto the case, but are positionable such that they assume different relative positions to one another in the working plane. Preferably, in this manner several and in particular all gripping units are displaceable and positionable relative to the support structure and also relative to one another.

For example, four gripping units are arranged on a support structure such that they lie opposite one another in pairs, wherein the distance which is present between the gripping units of each gripping unit pair is variably displaceable. Each gripping unit pair preferably lies on a straight line which is parallel to the working plane, wherein the two straight lines cross at right angles.

The handling device is designed for example such that the displacing of the at least one gripping unit can be effected before carrying out a handling procedure, in order to optimally align the several gripping units with respect to an object to be handled.

The handling device can further be designed such that the displacing of the at least one gripping unit relative to the support structure can be effected during the handling procedure, in particular given an already gripped and firmly held object. In the context of supple objects, in particular textile objects, for example material webs, this in particular permits a tensioning of the object before being put down again.

The displacing of the gripping units can be created in particular in a motoric manner by way of at least one drive unit which can be actuated for example electrically or by way of fluid force. An electronic control device of the handling device can control the actuation of the servo motors. Additionally or alternatively, a manual displaceability can also be provided.

Concerning a preferred embodiment of an adhesion gripping device which is provided with several gripping units, the working regions of several gripping units are arranged distanced to one another in a main direction which is parallel to the main plane of the adhesion gripping device. The several working regions therefore lie in the same plane, in which the adhesion tape also extends. This above all favours the handling of objects with a large construction length.

The several working regions are preferably arranged such that they lie with one another at the same height in a height direction of the adhesion gripping device. They then lie together in a working plane which extends at right angles to the main plane.

Several gripping units of the adhesion gripping device can be designed independently of one another and each have an individual adhesion tape. Herein, each adhesion tape runs between two holding regions of the support structure which are assigned to the related adhesion tape alone and are formed for example by a winding roller. The advantage of such a design is that the several gripping units can be used independently of one another in a relatively simple manner. For example, given a release procedure, several gripping units of the adhesion gripping device can be released from an object in a temporally staggered manner.

Concerning an adhesion gripping device which is equipped with several gripping units, it is seen as being particularly advantageous if one and the same adhesion tape is simultaneously used as an adhesion tape for several gripping units. An adhesion tape which runs between two holding regions of the support structure is then commonly assigned to several gripping units of the adhesion gripping device. This common adhesion tape passes through the working regions of the several gripping units, wherein the gripping sections which are passing through these working regions are formed by longitudinal sections of one and the same adhesion tape which are distanced to one another. Such an embodiment favours a synchronised actuation of the several gripping units. Furthermore, the number of adhesion tapes which are to be simultaneously used in the adhesion gripping device is reduced.

Concerning a particularly inexpensive embodiment of the handling device, only the release deflection element is present as a deflection element for the adhesion tape in the working region of at least one and preferably each gripping unit. As a rule, this leads to the gripping section passing through the working region with an arcuate longitudinal course. Concerning such a construction, the contact surface between the gripping section and the object to be gripped is relatively small, so that the object is treated in a very gentle manner.

Alternatively, at least one gripping unit in its working region, additionally to the release deflection element, can comprise a further deflection element for the adhesion tape, said further deflection element being distanced in the main plane with respect to this release deflection element and, as the release deflection element, being partially wrapped by the adhesion tape. The gripping section extends with a preferably linear longitudinal course between the release deflection element and the further deflection element. Given the release movement of the release deflection element which is caused by the release drive unit, the distance between the release deflection element and the further deflection element reduces, so that the surface section of the gripping section which adhesively interacts with a firmly held object, and consequently the holding force, is reduced in magnitude.

Preferably, the release deflection element and the further deflection element are arranged in a common plane concerning each gripping unit, said plane running at right angles to a height direction of the adhesion gripping device.

Concerning the further deflection element which is assigned to a working region, it is preferably the case of a stationary deflection element which is fixed in location with respect to the support structure. In contrast to the release deflection element, given a release procedure it retains its spatial relative position with respect to the support structure. This reduces the kinematic effort for realising the gripping unit. Basically however, it is possible to design a gripping unit such that the further deflection element also forms a release deflection element which given a release procedure can carry out or carries out a translatory relative movement with respect to the support structure in the main plane.

Irrespective of whether the further deflection element is stationary or movable with respect to the support structure, it is advantageous if this further deflection element is designed as a deflection roller which is rotatable with respect to the support structure about a rotation axis which is at right angles to the main plane. Preferably, the release deflection element as well as the further deflection element are each designed as such a rotatable election roller. Each deflection rollers is preferably mounted in a freely rotatable manner and is not coupled directly to a drive unit.

A preferred embodiment envisages the release deflection element being biased into a gripping position by a spring force by way of a spring device. By way of a suitable actuation of the positioning device which carries it and given a release deflection element which is situated in the gripping position, the adhesion gripping device can be pressed with the gripping section onto the object to be gripped, for gripping an object. One can envisage the release deflection element being deflectable or being deflected counter to the spring force on pressing the gripping section onto the object; this for example being up to the contact of the object on an object support device of the adhesion gripping device. At all events, with regard to a release deflection element which is biased by way of a spring device, it is advantageous if this release deflection element is movable counter to the spring force and relative to the support structure into at least one release position which differs from the gripping position, by way of the release movement which can be created by the release drive unit. By way of this, the gripping section which is led around the release deflection element is pulled away from the object to be released. This procedure can be advantageously assisted by way of the object being actively prevented from following the release defection element by way of an object support device. This is particularly advantageous on handling flexible, in particular supple objects such as for example textile objects.

The release drive unit according to a preferred aspect of the invention is designed such that a tensile force which creates the release movement of the release deflection element can be introduced by it into the adhesion tape. In particular, the tensile force can be introduced into the adhesion tape in the longitudinal direction of the tape. In other words, the release drive unit is designed in order to pull on the adhesion tape, wherein on account of the fact that it is firmly held in one of the holding regions, the adhesion tape is pressed with the rear surface which is opposite to the adhesion surface onto the release deflection element and displaces this with the pressing force resulting therefrom, for carrying out the release movement. Particularly advantageously, this design can be implemented in combination with a release deflection element which is resiliently biased into a gripping position by way of a spring device.

In order to introduce the tension force into the adhesion tape, the release drive unit expediently comprises at least one drive motor which in one of the holding regions with regard to drive interacts with the adhesion tape and which is preferably electrically actuated, alternatively however also for example of a type which can be actuated by way of fluid force. Preferably, only one of the two holding regions is motorised, whereas the second holding region is designed in a drive-less manner and in particular has a brake which is designed for the releasable firm holding of the adhesion tape at least during the introduction of the tensile force. Hereby, it can be an active, for example electrically actuatable brake, or a passive brake which for example is based on a detent function and whose braking action only occurs up to a certain magnitude of the tensile force which is introduced into the adhesion tape.

It is seen as being particularly expedient to couple the release drive unit to the release deflection element with regard to drive independently of the adhesion tape for creating the release movement of the release deflection element. Hence the release deflection element can be driven by the release drive unit in a direct manner relative to the support structure for carrying out the release movement. A relative movement of the adhesion tape with respect to the release deflection element then directly results from this release movement, from which relative movement the initially mentioned circulating movement of the gripping section around the release deflection element results.

Of course, the release drive unit can also be designed such that the circulating movement of the gripping section about the release defection element and the release movement of the release defection element can be created by way of the simultaneous influence with regard to drive upon the adhesion tape as well as upon the release deflection element.

With regard to each gripping unit, the release deflection element is expediently seated in a stationary manner on a holding unit which is separate with respect to the support structure and which for its part is mounted on the support structure in a movable manner with respect to this, for creating the release movement of the release deflection element for carrying out the holding unit movement. The release drive unit which is arranged on the support structure is coupled in drive to the holding unit. A relative movement of the holding element with respect to the support structure, able to be created by the release drive unit, directly results in the release movement of the release deflection element.

The holding unit is preferably linearly displaceably mounted on the support structure, in particular in the manner of a slide. Suitable mounting means, for example at least one guide rail can effect a low-wear sliding mounting of the holding element with respect to the support structure.

An advantageous embodiment of the adhesion gripping device comprises two gripping units which each comprise a holding unit which is equipped with a release deflection element, wherein the two holding units with regard to movement are synchronised with one another in a manner such that they are each movable to one another whilst carrying out a holding unit movement relative to the support structure, for creating the release movement of the two release deflection elements which are carried by them.

As an advantageous equipping measure, the adhesion gripping device preferably comprises an object support device which is suitable for supporting the object which is to be gripped or which is gripped. The direct supporting effect is created by way of at least one support element of the object support device which is assigned to the working region of the gripping unit. Each support element has a support surface which faces the same direction as the adhesion surface on the at least one gripping section.

The at least one support element according to a particularly inexpensive embodiment is attached to the support structure in a stationary manner Given a functionally particularly advantageous design, the at least one support element is movable relative to the support structure, so that it can execute a linear travel movement with respect to this, concerning which movement it can be moved onto the working region or away from the working region depending on the linear travel direction. The object support device which is provided with at least one movable support element expediently comprises a linear travel drive unit which is designed for producing the linear travel movement and which is preferably of the type which can be actuated by fluid force, but can also be designed in an electrically actuatable manner without further ado.

The adhesion gripping device is preferably applied onto an object to be handled with the at least one support element in front, for gripping the object. If the support element is designed in a movable manner, the linear travel movement after gripping an object can be used to assist the detachment procedure of the object from the gripping section by way of the object being pressed away from the gripping section.

The object support device in particular with the gripping procedure can also preferably be used as a holding-down element which fixes the object to be gripped.

The object support device can also be used to support the gripped object and to stabilise it in its firmly held position, until it is deposited again.

The at least one support element of the object support device can be suspended in a resiliently compliant manner, so that on gripping an object it can be pressed back by the contact with the object until the gripping section adheres to the object.

The initially mentioned positioning device which can advantageously be used for handling the adhesion gripping device is expediently a direct constituent of the handling device.

BRIEF DESCRIPTION OF THE DRAWINGS

The invention is hereinafter explained in more detail by way of the accompanying drawings. In these are shown in.

DETAILED DESCRIPTION

Figure 13:
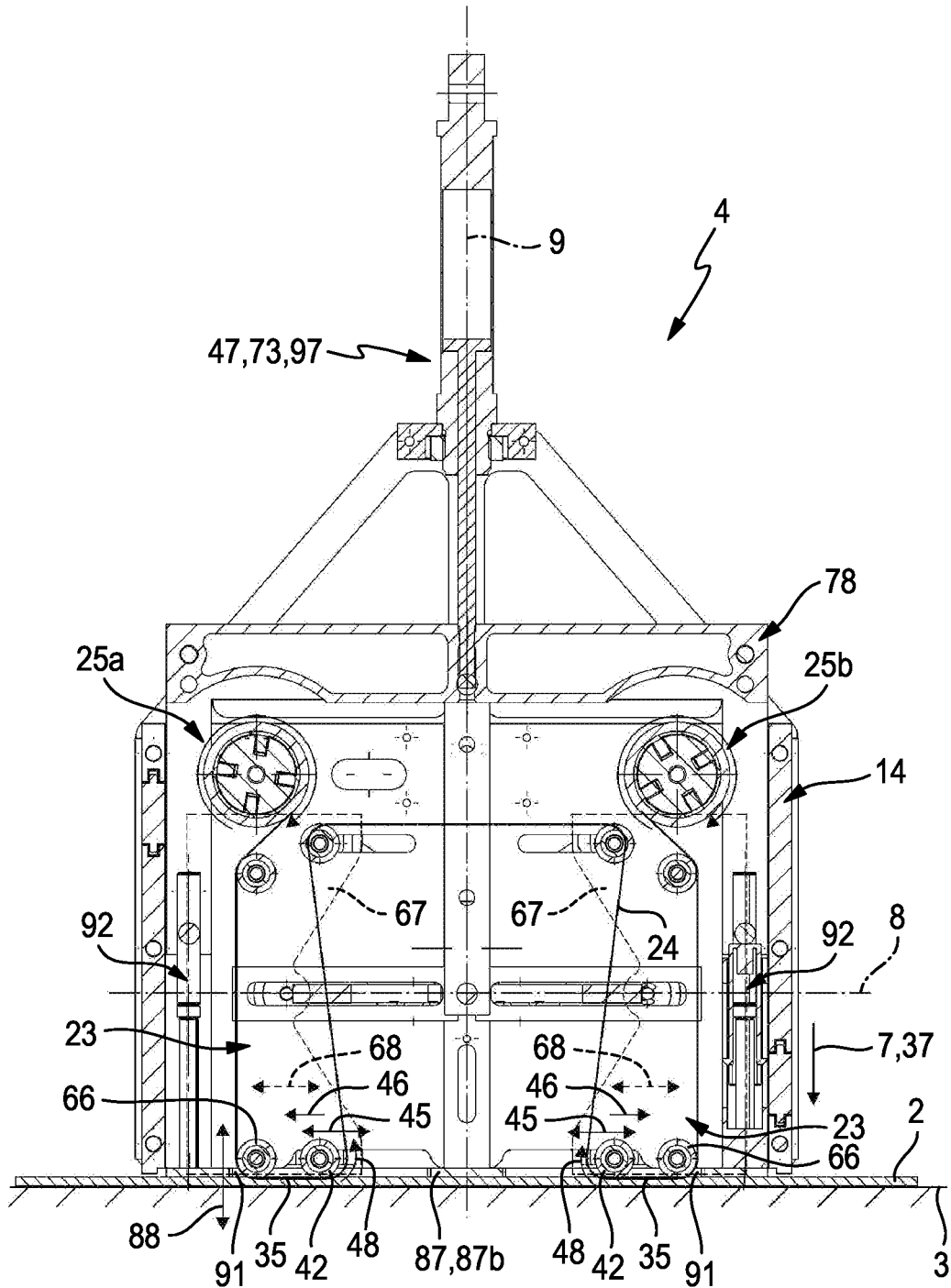
Figure 14:
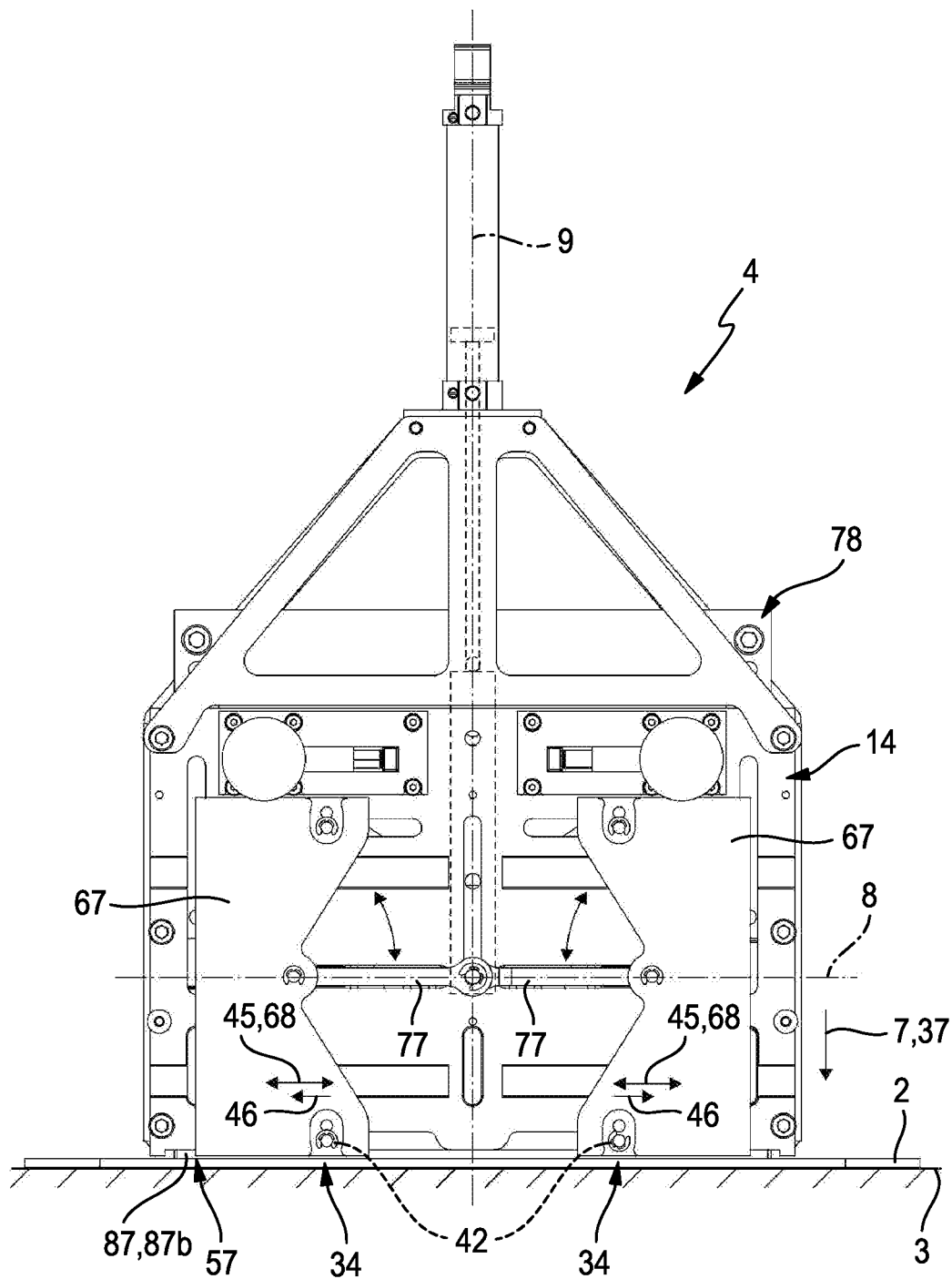
Figure 15:
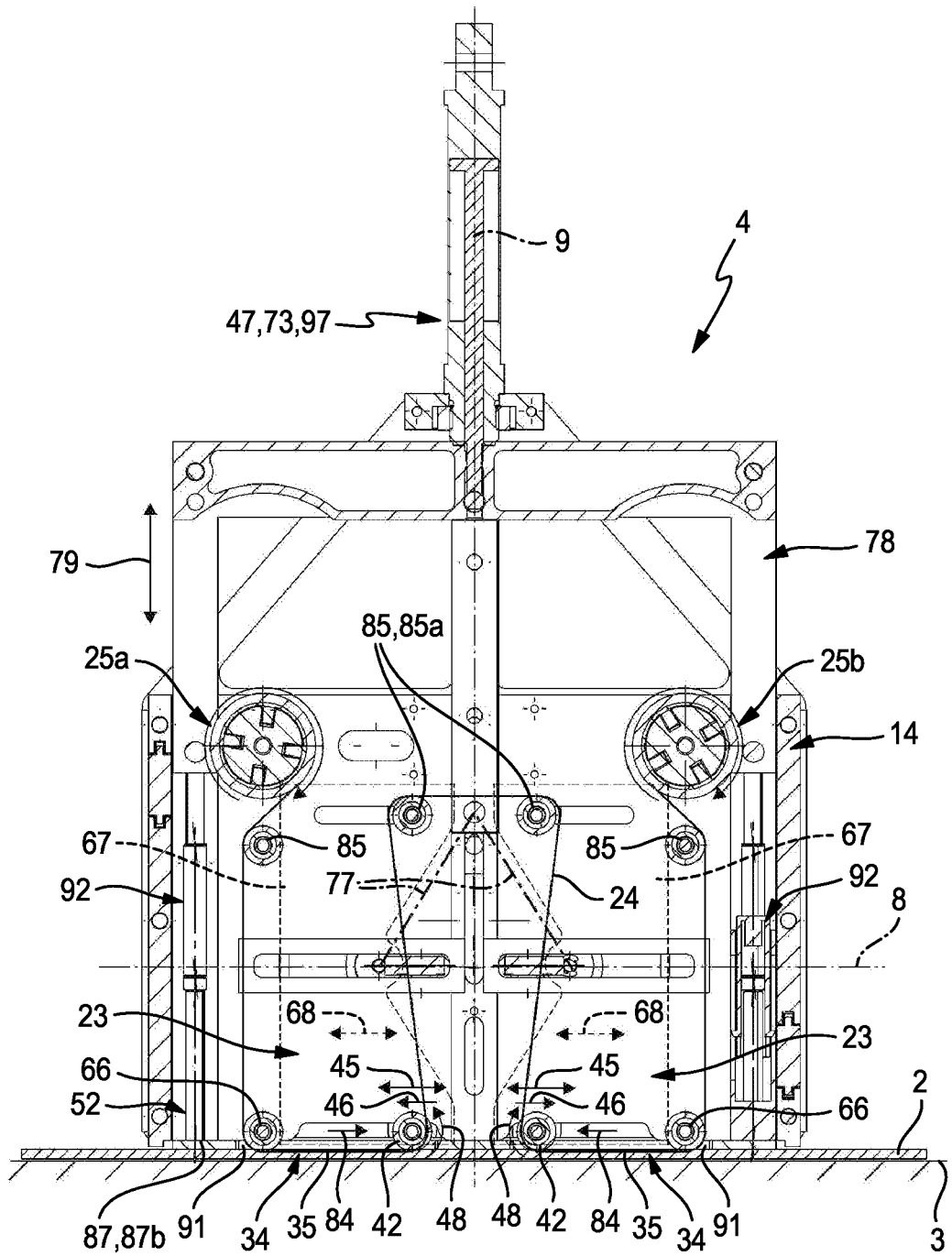
Figure 16:
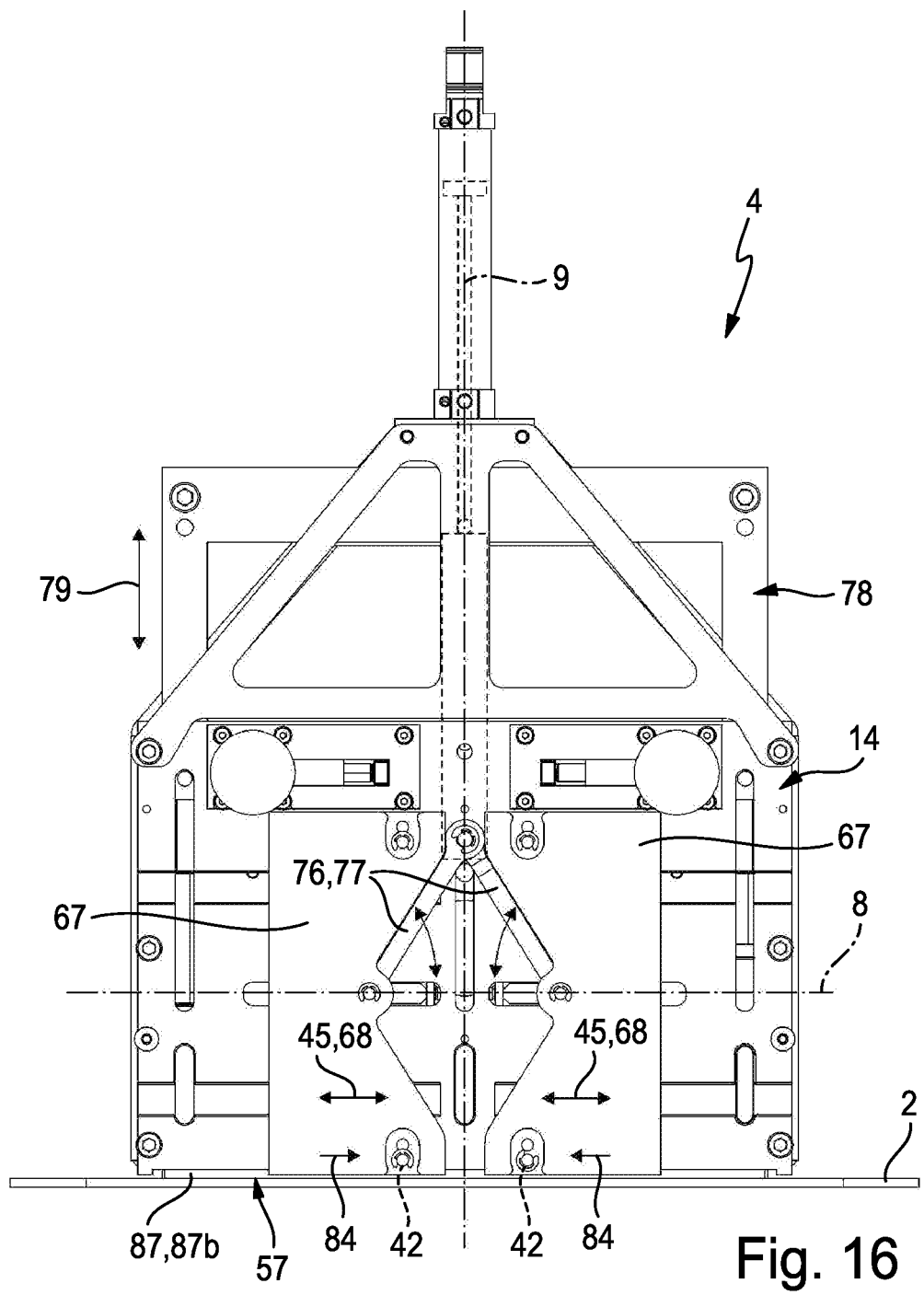
Figure 17:
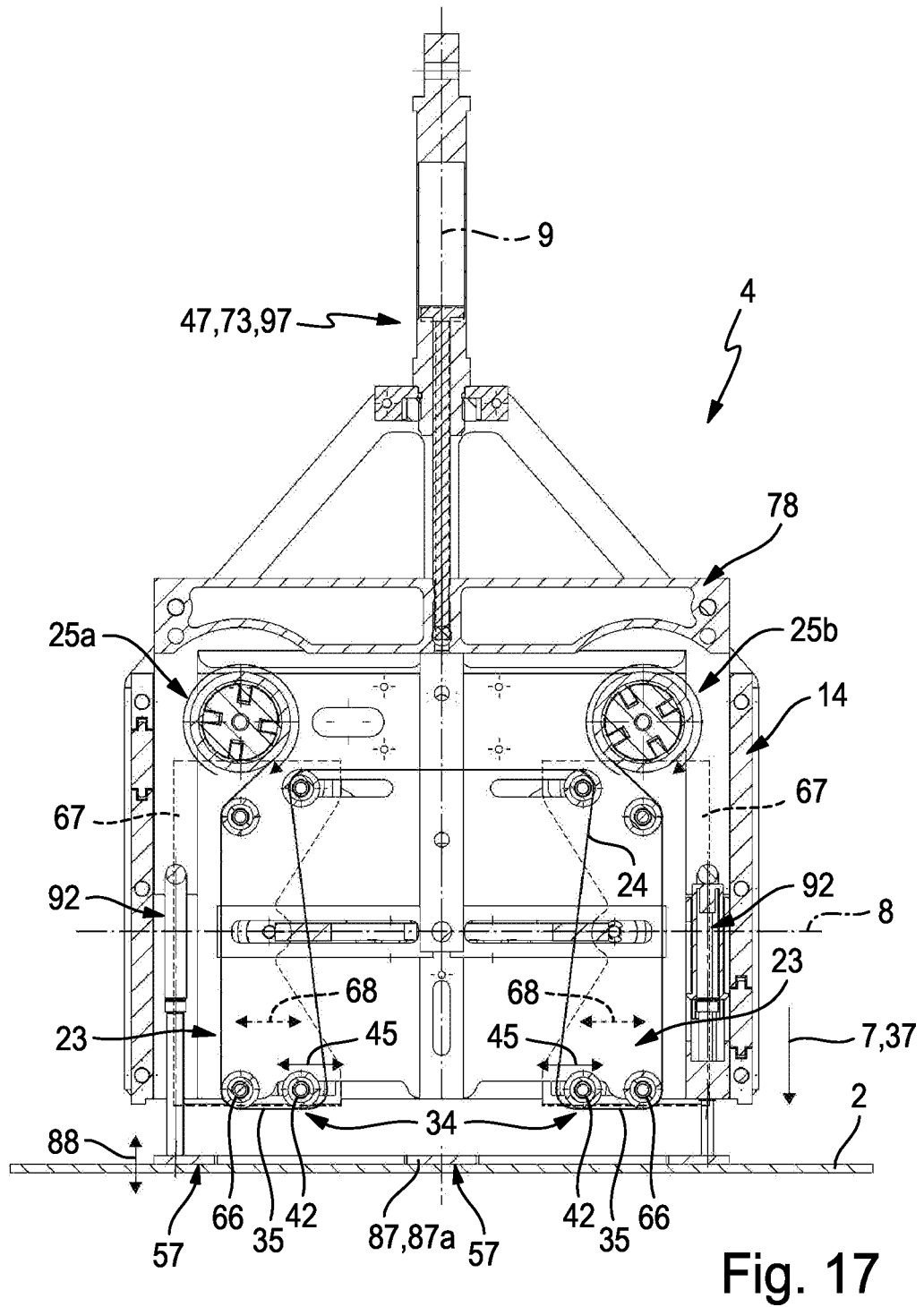
Figure 18:
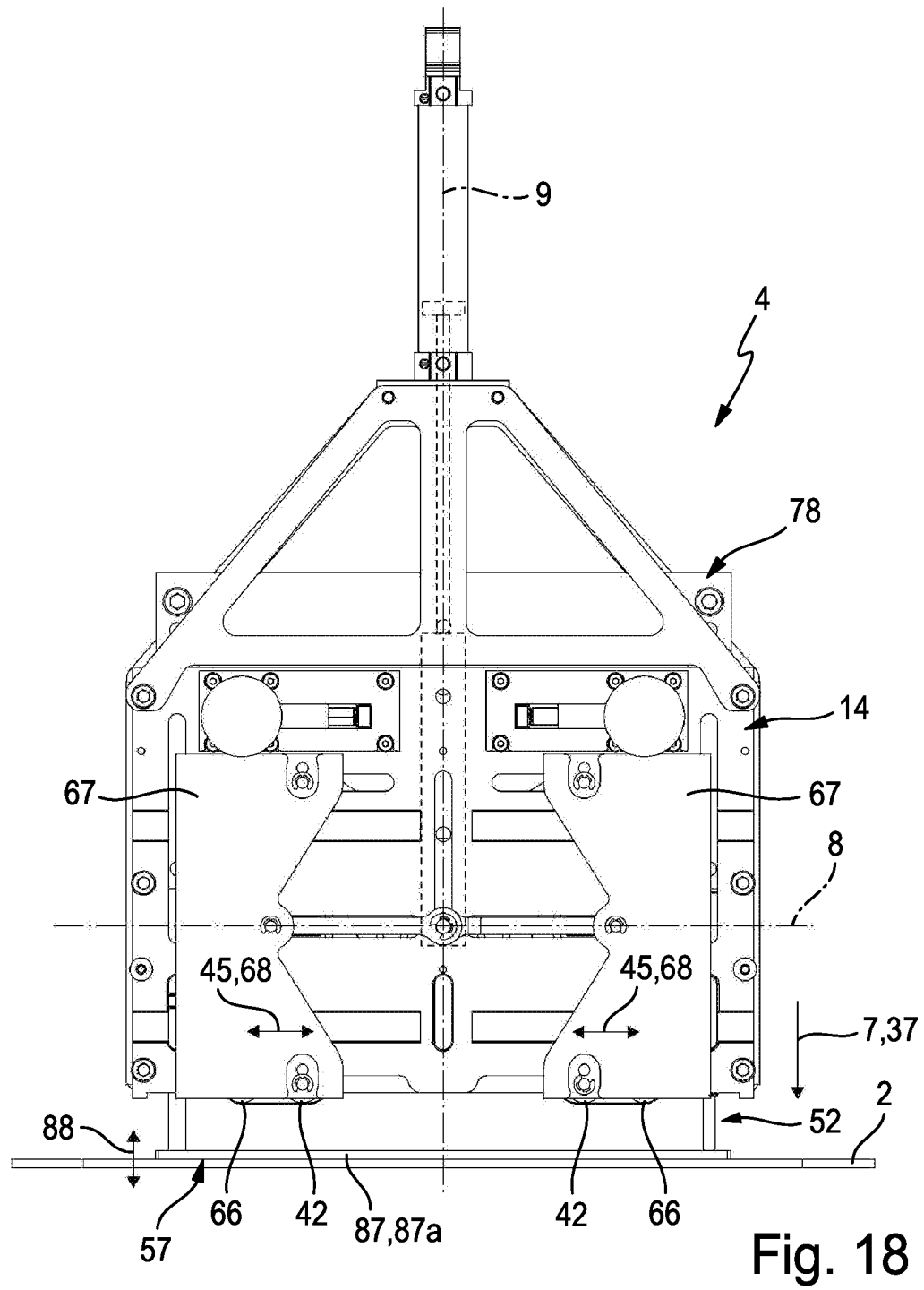

On carrying out a method for repositioning an object, FIGS. 15 and 16 also represent an operating phase in which the object is gripped and can be repositioned by way of carrying out a handling movement which is creatable by the positioning device. FIGS. 13 and 14 simultaneously represent an operating phase on releasing the previously gripped object. FIGS. 17 and 18 simultaneously represent an operating phase on gripping an object, said operating phase being subsequent to the operating phase of FIGS. 6 to 12.

Summarised once again, concerning the embodiment example of FIGS. 6 to 18 and given a cycle for repositioning an object, FIGS. 6 to 12 represent a first operating phase, FIGS. 17 and 18 a subsequent second operating phase, FIGS. 13 and 14 a subsequent third operating phase, FIGS. 15 and 16 a subsequent fourth operating phase, again FIGS. 13 and 14 a subsequent fifth operating phase, again FIGS. 17 and 18 a subsequent sixth operating phase and finally again FIGS. 6 to 12 a concluding seventh operating phase.

Figure 1:
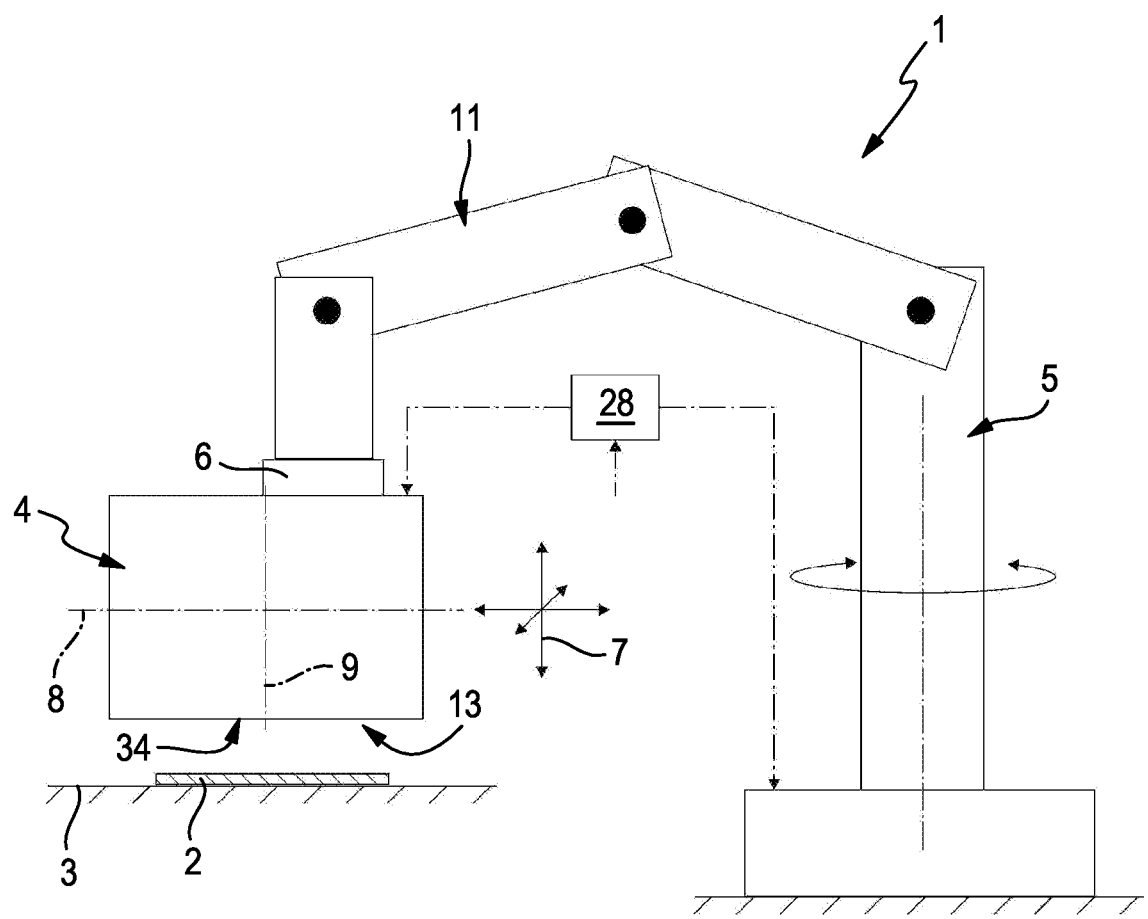
FIG. 1 a schematic representation of a preferred embodiment of the handling device according to the invention, wherein an adhesion gripping device which is only illustrated schematically is assembled on a positioning device which is suitable for creating a handling movement of the adhesion gripping device, FIG. 2 a preferred first embodiment of the adhesion gripping device in a lateral view with a viewing direction according to arrow II from FIG. 3, wherein an operating phase on gripping an object to be repositioned is shown, FIG. 3 the adhesion gripping device of FIG. 2 in a plan view in the viewing direction according to arrow III from FIG. 2, FIG. 4 the adhesion gripping device of FIG. 2 with the same viewing direction as in FIG. 2 and likewise in an operating phase on gripping an object, FIG. 5 the adhesion gripping device of the FIGS. 2 to 4 in a viewing direction according to the arrow II of FIG. 3 during an operating phase of the release of a previously gripped and firmly held object, FIG. 6 a further embodiment of the adhesion gripping device in a lateral view with a viewing direction according to arrow VI from FIG. 7 in an operating phase before the gripping of an object which is illustrated lying on an underlay, FIG. 7 a section through the adhesion gripping device according to section line VII-VII from FIGS. 6 and 11, FIG. 8 a further section through the adhesion gripping device according to section line VIII-VIII from FIGS. 6 and 11, FIG. 9 a further section through the adhesion gripping device according to section line IX-IX from FIGS. 6 and 11, FIG. 10 a further section through the adhesion device according to section line X-X from FIGS. 6 and 11, FIG. 11 a further section through the adhesion gripping device according to section line XI-XI from FIG. 7, FIG. 12 a further lateral view of the adhesion gripping device according to FIGS. 6 to 11 with a viewing direction according to arrow XII-XII from FIG. 7, so that the side of the adhesion gripping device which is opposite to FIG. 6 is recognisable, FIG. 13 in a sectioned representation according to FIG. 11, the adhesion gripping device in an operating phase of the gripping of an object which is lying ready on an underlay, FIG. 14 the arrangement of FIG. 13 in a viewing direction according to arrow XII of FIG. 7, FIG. 15 in a sectioned representation corresponding to FIGS. 11 and 13, a further operating phase on gripping an object, FIG. 16 the arrangement of FIG. 15 in a lateral view with a viewing direction according to arrow XII from FIG. 7, FIG. 17 in a sectioned representation corresponding to FIGS. 11, 13, and 15, an operating phase of the adhesion gripping device on releasing the previously gripped object, and FIG. 18 the arrangement of FIG. 17 in a lateral view with a viewing direction according to arrow XII-XII from FIG. 7.

A handling device 1 is shown in FIG. 1, said device being designed in order to reposition an arbitrary object 2. The term "reposition" in particular is to be understood to the extent that the object 2 is to be received at a starting point and after a certain relocation is to be deposited again at a target point. As a rule, the starting point and the target point are distanced to one another, but can also coincide. An object 2 which is received at the starting point, for example after a reorientation can be deposited again at a target point which corresponds to the starting point.

The object 2 to be repositioned is expediently supplied for its repositioning by a supply device 3 which in the simplest case is an underlay, for example a table, on which the object 2 is deposited. The supply device 3 can be a constituent of the handling device 1.

As a main component, the handling device 1 comprises an adhesion gripping device 4. It is capable of gripping the object 2 for the purpose of a repositioning procedure, of firmly holding it and of letting go of it again. This adhesion gripping device 4 is only illustrated symbolically in FIG. 1, and advantageous embodiments are illustrated in the FIGS. 2 to 18.

Given its designated use, the adhesion gripping device 4 is expediently attached to a positioning device 5 which expediently is likewise a constituent of the handling device 1. The adhesion gripping device 4 has a fastening interface 6 which for example is designed as a fastening flange which is suitable for the screw fastening and amid whose involvement the adhesion gripping device 4 is fastenable or fastened to the positioning device 5, in particular in a releasable manner.

Concerning the illustrated embodiment example, the positioning device 5 is formed by a robot which has a robot arm 11 which is movable in several degrees of freedom of movement by way of a motoric drive means not illustrated further and on which the adhesion gripping device 4 is assembled with its fastening interface 6. The positioning device 5 by way of example is driven in an electrical and/or pneumatic and/or hydraulic manner Differing from the illustrations, the positioning device 3 can also for example have a portal-like construction.

The adhesion gripping device 4 can be driven into a handling movement 7 which is schematically indicated by the arrows, by way of a suitable operation of the positioning device 5. The already mentioned repositioning of an object 2 can already take place within the framework of this handling movement 7. The handling movement 7 is preferably a three-dimensional movement, but can indeed also be restricted to an only two-dimensional or one-dimensional movement. Rotation movement degrees of freedom are also possible and in particular can be superimposed without further ado.

The adhesion gripping device 4 has an imaginary main axis 8 which given a normal operating manner of the handling device 1 is orientated horizontally. The adhesion gripping device 4 moreover has an imaginary height axis which is perpendicular to the main axis 8. It is aligned vertically given a common operating manner of the handling device 1. Together, the main axis 8 and the height axis 9 span a main plane 12. The main plane 12 runs parallel to the plane of the drawing in FIGS. 2, 4, 5, 6, and 11 to 18.

The adhesion gripping device 4 also yet has an imaginary transverse axis 10 which runs perpendicularly to the main plane 12.

For simplification, hereinafter the axis direction of the main axis 8 is denoted as the main direction 8, the axis direction of the height axis 9 as the height direction 9 and the axis direction of the transverse axis 10 as the transverse direction 10, wherein corresponding reference numerals have been use in each case for simplification.

The two sides of the adhesion gripping device 4 which are orientated opposite one another in the transverse direction 10 are hereinafter denoted as the front side 15 and as the rear side 16 for a better differentiation.

Irrespective of their denotation, the mentioned axes 8, 9, 10 as well as the direction and side details do not specify an obligatory absolute alignment of the adhesion gripping device 4 during its operation. For example, the adhesion gripping device 4 can also be used for example with an alignment in which a lower side 13 which in the drawing faces downwards in the height direction 9 is orientated laterally and/or to the top.

The present description of embodiment examples of the adhesion gripping device 4, inasmuch as is not specified otherwise in the individual case, relates to all illustrated embodiment examples.

The adhesion gripping device 4 comprises a support structure 14 which is responsible for its stability. It practically forms a frame of the adhesion gripping device 4, on which frame the relevant components are attached in a direct or indirect manner. The fastening interface 6 is located on the support structure 14. The support structure 14 consequently always participates directly in the handling movement 7.

Concerning the embodiment example of FIGS. 2 to 5, the support structure 14 consists essentially of a support plate 17 which extends in the main plane 12.

Concerning the embodiment example of FIGS. 6 to 18, the support structure 14 comprises a carrier element 14a which is assigned to the front side 15, a rear carrier element 14b which is distanced to this front carrier element in the transverse direction 10 and two transverse elements 14c which connect the carrier elements 14a, 14b to one another at the end regions. which are orientated in the main direction 8. At the upper side 18 of the adhesion gripping device 4 which is opposite to the lower side 13, the two carrier elements 14a, 14b are preferably connected to one another by a yoke element 14e. An intermediate element 14d of the support structure 14 which is distanced to the two carrier elements 14a, 14b in the transverse direction 10 and which is fastened for example to the two transverse elements 14c is located between the two front and rear carrier elements 14a, 14b which extend at least essentially parallel to the main plane 12.

The support structure 14 has a support section 22 which concerning the embodiment examples of FIGS. 2 to 5 is formed by the support plate 17. Concerning the embodiment example of FIGS. 6 to 18, the support section 22 consists of the intermediate element 14d and of a part section 14b' of the rear carrier element 14b which lies opposite the intermediate element 14d at a distance in the transverse direction 10.

It is to be understood that the support section 22 just as the support structure 14 as a whole can also be realised in another design manner.

Concerning the embodiment example of FIGS. 2 to 5, the fastening interface 6 is located on the support plate 17 in the region of the upper side 18. Concerning another embodiment example, it is formed at the front and outside on the front carrier element 14a.

At least one gripping unit 23 is arranged on the support structure 14. Concerning the embodiment example of FIGS. 2 to 5, the support structure 14 only carries a single gripping unit 23. The same is arranged there on the support plate 17, in particular in the region of the front side 15.

Concerning the embodiment example of FIGS. 6 to 18, the support structure 14 is equipped with several gripping units 23, wherein it specifically comprises two gripping units 23. Both gripping units are preferably attached to the support section 22. The two gripping units 23 are arranged next to one another in the main direction 8.

Each gripping unit 23 comprises a flexible bendable adhesion tape 24 which despite this has a high tensile strength. In particular, it consists of a plastic material and is preferably thin in a foil-like manner.

The adhesion band 24 extends between two first and second holding regions 25a, 25b which are distanced to one another in the main plane 12 and in which it is fixed in each case with one of two tape sections which are opposite one another to the support structure 14, by way of example to the support section 22.

Expediently, each gripping unit 23 in each holding region 25*a*, 25*b* comprises a winding roller 26 which is rotatably mounted on the support structure 14. The rotation axes of the winding rollers run at right angles to the main plane 12. The winding roller 26 which is arranged in the first holding region 25*a* is conceived as a wind-off roller 26*a*, on which unconsumed adhesion tape 24 is wound and supplied. Concerning the winding roller 26 which is arranged in the second holding region 25*b*, it is the case of a wind-up roller 26 which is in the position of receiving consumed adhesion tape 24 in a wound-up manner.

The adhesion tape 24 can be wound bit by bit from the wind-off roller 26*a* onto the wind-up roller 26*b* by way of a tape transport drive unit 27 which acts at least upon the wind-up roller 26*b* and is arranged on the support structure 14. The tape transport drive unit 27 is preferably controllable by way of an electronic control device 28 which is preferably designed as a constituent of the handling device 1, in a manner such that a discontinuous winding-over procedure takes place. The winding-over can therefore take place in a cycled manner to the extent at which the adhesion tape 24 is subjected to a length-wise consumption or wearing on operation of the adhesion gripping device 4.

The tape transport drive unit 27 with regard to operation is expediently also connected to the wind-off roller 26*a*, in order give a wind-over procedure to permit a controlled re-feed and to ensure that the adhesion tape 24 is kept under a certain tension.

By way of example, the tape transport drive unit 27 comprises a preferably electrical a drive motor 29 which with regard to drive is connected to the wind-up roller 26*b*. It further preferably comprises an in particular electrically actuatable brake 32 which with regard to drive is connected to the wind-off roller 26*a*. The drive motor 29 and the brake 32 can be controlled by the electronic control device 28 in a manner coordinated to one another, in order to create a cycled winding-over and in order to obtain the designed tape tension outside the winding procedures.

The electronic control device 28 is otherwise also preferably designed to electronically control the positioning device for creating the handling movement 7 which is desired for the adhesion gripping device 4. For this, the electronic control device 28 is connected to the positioning device 5.

The embodiment example of FIGS. 2 to 5 makes it clear that instead of a brake 32 which can be influenced by the control device 28, an autonomously operating brake 32 which operates without control signals to be fed can also be provided. Hereby, in particular it is the case of a detent brake 32*a*, concerning which a spring-loaded detent member 32*b* interacts with a detent toothing 32*c* which is provided on the wind-off roller 26*a*. Here, the wind-off roller 26*a* is firmly held in a non-rotatable manner by way of a positive detent, until a tension force is introduced into the adhesion tape 24 by way of the drive motor 26*b*, said tensile force being sufficiently large, in order to overcome the detent resistance.

The adhesion tape 24 is provided at least at one side and preferably exclusively at one side with an adhesion surface 33 which develops a releasable adhesive effect. For example, the adhesion tape 24 comprises a carrier or substrate tape which is coated with an adhesively acting adhesion layer which defines the adhesion surface 33. The adhesion tape 24 is preferably a self-adhesive tape, concerning which the adhesion surface 33 is formed by a self-adhesive surface.

Each gripping unit 23 has a working region 34 through which the supple adhesion tape 24 extends. The length section of the adhesion tape which runs in the working region 34 is used for gripping and firmly holding the object 2 to be repositioned and is therefore denoted as a gripping section 35 for an improved differentiation.

In the working region 34, the adhesion tape 24 is designed such that the section of the adhesion surface 33 which is located on the gripping section 35 faces away from the adhesion gripping device 4. Preferably and according to the embodiment examples, the working region 34 is located in the region of the lower side 13 of the adhesion gripping device 4, wherein the adhesion surface 33 of the gripping section 35 points downwards.

According to a multi-equipping with gripping units 23, the adhesion gripping device of FIGS. 6 to 18 comprises several, by way of example two working regions 34. Consequently, a corresponding number of gripping sections 35 is also present. The several working regions 34 and hence also the several gripping sections 35 are preferably arranged distanced to one another in the main direction 8. With respect to the height direction 9, they expediently lie at the same height in a common working plane 36 which is at right angles to the height axis 9.

Figure 4:
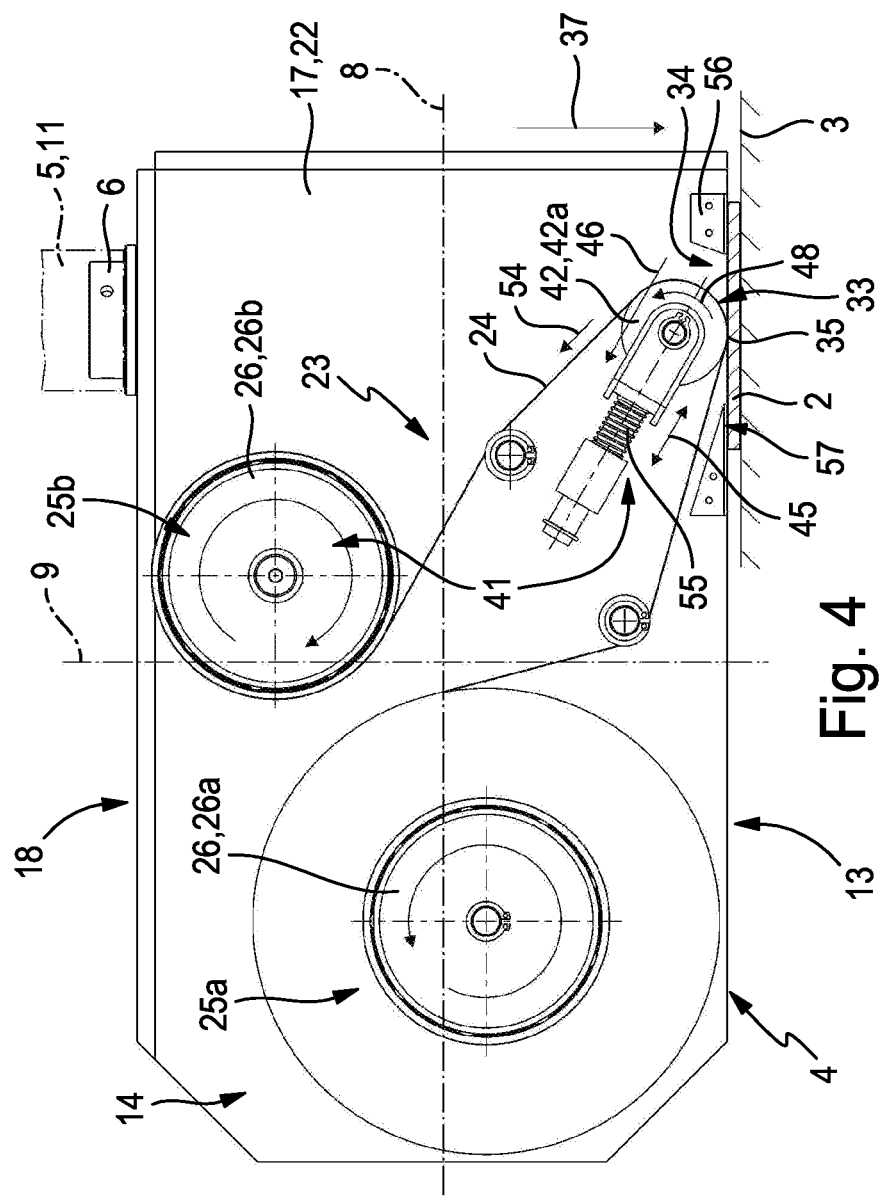

In order to grip an object 2, the adhesion gripping device 4 by way of the handling movement 7 according to FIGS. 13, 14, 17 and 18 with an application movement 37 can be applied onto the object 2 such that the gripping section 35 with the adhesion surface 33 which is formed thereon come to bear on the object 2 to be gripped. If subsequently the adhesion gripping device 4 is displaced by way of a further handling movement 7, then the object 2 remains adhering to the gripping section 35 and participates in the further handling movement 7. This correspondingly applies to the embodiment example of FIGS. 2 to 5, wherein the application movement is illustrated in FIG. 4.

The adhesion gripping device 4 is provided with a release device 41 with whose help the gripping section 35 when required can be released again from the object 2 which is firmly held by it, in order to deposit the object 2 again at the desired target point of the handling procedure.

At least one release deflection element 42 which is arranged in the working region 34 of the gripping unit 23 and is partially wrapped by the adhesion tape 24 belongs to the release device 41. Common to the illustrated embodiment examples is the fact that only one such release deflection element 42 is assigned to each working region 4.

The release deflection element 42 is expediently formed by a deflection roller 42*a* which is rotatably mounted in such a manner that it is rotatable relative to the support structure 14 about a rotation axis 43 which is at right angles to the main plane 12. The rotation axis 43 coincides with the longitudinal axis of the deflection roller 42*a*. Preferably, the deflection roller 42*a* which forms the release deflection element 42 is mounted in a freely rotatable manner.

The peripheral surface of the deflection roller 42*a* which faces radially outwards with respect to the rotation axis 43 forms an arcuately bent deflection surface 44, about which the adhesion tape is wrapped. The specifically wrapped arc length of the deflection surface 44 is expediently less than 180 degrees. Concerning the embodiment example of FIGS. 2 to 5, the arc length is about 150 degrees, and with the embodiment example of FIGS. 6 to 18 is about 100 degrees.

If a winding-over procedure takes place whist using the tape transport drive unit 27, then the release deflection element 42 runs on the rear surface of the running-past adhesion tape 24 which is opposite to the adhesion surface 33.

Concerning an embodiment example which is not shown, the release deflection element 38 is designed in a non-rotatable manner, wherein the deflection surface 44 functions as a sliding surface, on which the adhesion tape 24 slides with the mentioned winding-over procedure. The release deflection element 38 here for example can be a deflection block or a deflection bar.

Irrespective of its specific realisation, the release deflection element 42 is integrated into the adhesion gripping device 4 in a manner such that it is translationally movable to and fro in the main plane 12 relative to the support structure 14. Concerning this relative movement which is illustrated in the drawing by a double arrow and is denoted as a deflection element movement 45, it is preferably the case of a linear movement. According to an embodiment example which is not illustrated, the translatory deflection element movement 45 can be a non-linear movement, for example a movement which follows an arc, in particular a circular arc. Given the deflection element movement 45, the release deflection element 42 as a whole changes its relative position which is assumed with respect to the support structure 14.

The deflection element movement 45 comprises a release movement 46 which is indicated in the drawing by an arrow and which corresponding to the deflection element movement 45 follows a straight-lined or a non-linear, for example arcuate path. This release movement 46 is of importance for the detachment of the gripped object 2 from the gripping section 35.

The release device 41 further comprises a release drive unit 47 which is arranged on the support structure. It is capable of creating a circulating movement 48 of the gripping section 35 of the adhesion tape 24 around the assigned release deflection element 42, said movement being illustrated in the FIGS. 4, 5, 11, 13, and 15 by the arrows, and in this context of simultaneously also creating the release movement 46 of the release deflection element 42 which is translatory with respect to the support structure 14. This procedure which is hereinafter denoted as a "release action" effects an active pulling-off of the gripping section 35 from the object 2 which adheres thereto, so that the object 2 is completely or partly detached from the adhesion gripping device 4.

The pulling-off procedure which is entailed by the release action does not need to relate to the complete length of the gripping section 35 which adheres to the object 2. The complete pulling-off can indeed be the case and by way of example occurs with the embodiment example of FIGS. 2 to 5. However, the pulling-off procedure can also take place in a manner such that a residual region of the original surface of the gripping section remains adhering to the object 2 after the circulating movement 48 and the release movement 46 which is entailed by this, so that an additional finalising release measure is subsequently to be made, in order to completely remove the object 2 from the gripping section 35 which is reduced in its effective surface. This finalising release measure in particular consists of a pressing-away of the adhering object 2 from the adhesion surface 33 of the gripping section 35. Given a suitable weight of the object 2, this can be affected solely due to gravitational force, if, given the release action, the object 2 has the possibility of dropping downwards. Alternatively, the adhesion gripping device 4 can be provided with an object support device 52 which can be supported on the firmly held object 2 such that this can be actively pressed away from the gripping section 35. This object support device 52 then forms a constituent of the release device 41.

The embodiment examples of FIGS. 2 to 5 illustrate the advantageous possibility of designing the release drive unit 47 such that a tensile force 47 which creates the release movement 46 of the release deflection element 42 can be introduced into the adhesion tape 24 by way of it.

The release drive unit 47 here is formed by a tape transport drive unit 27, so that the drive motor 29 and the brake 32 which have already been explained further above belong to it. For introducing the tensile force 54 into the adhesion tape 24, the wind-up roller 26b is drivable in a rotary manner in the winding-up direction by way of the drive motor 29, whereas simultaneously the wind-off roller 26a can be blocked by way of the brake 32, so that no adhesion tape 24 can follow on. The consequence of this is a shortening of the longitudinal section of the adhesion tape 24 which extends between the two winding rollers 26, which results in the region of the gripping section 35 which is wrapped around the release deflection element 42 forcing the release deflection element 42 back out of the working region 34, so that the adhesion tape 24 is pulled away and in particular peeled away from the object 2.

Figure 2:
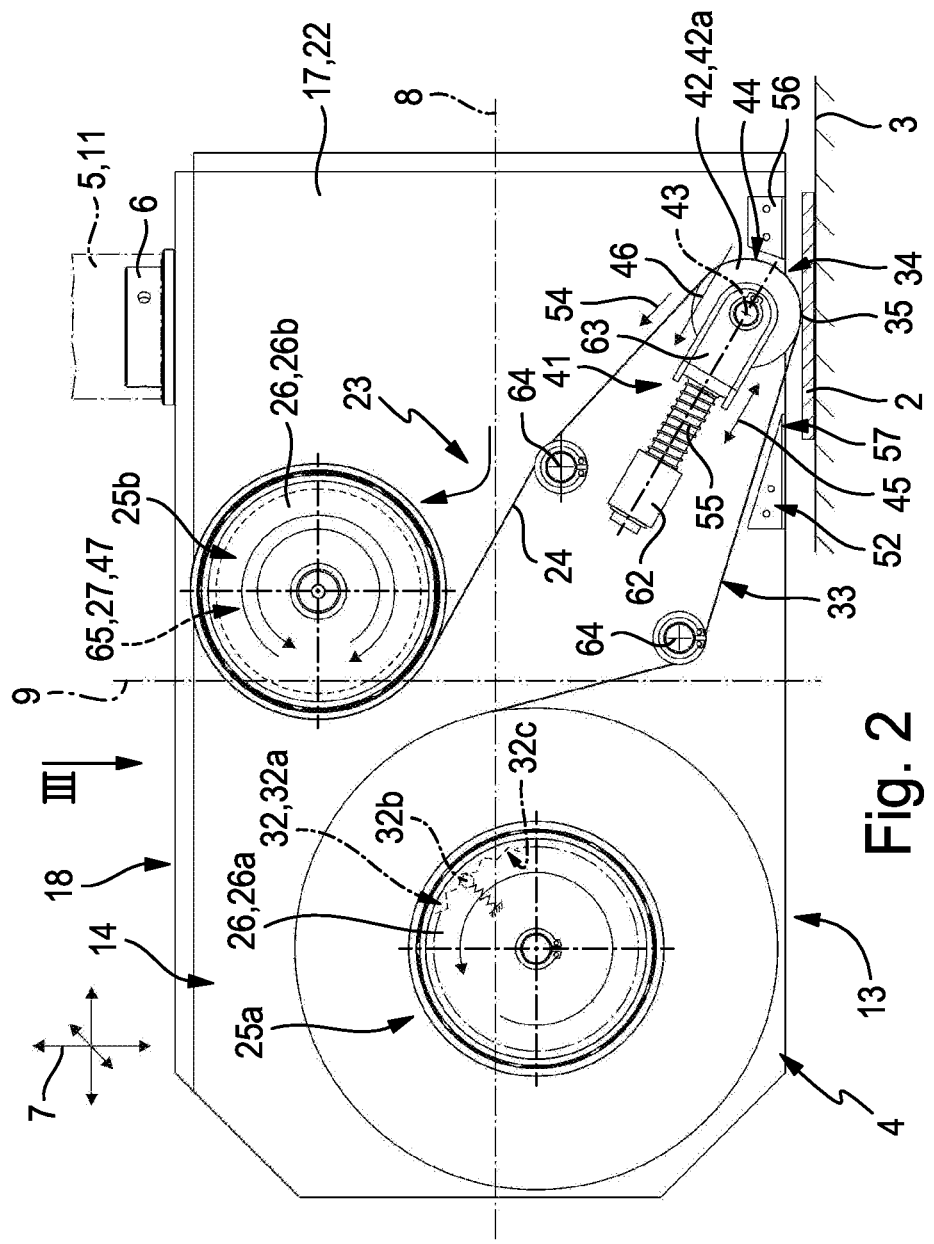
Figure 3:
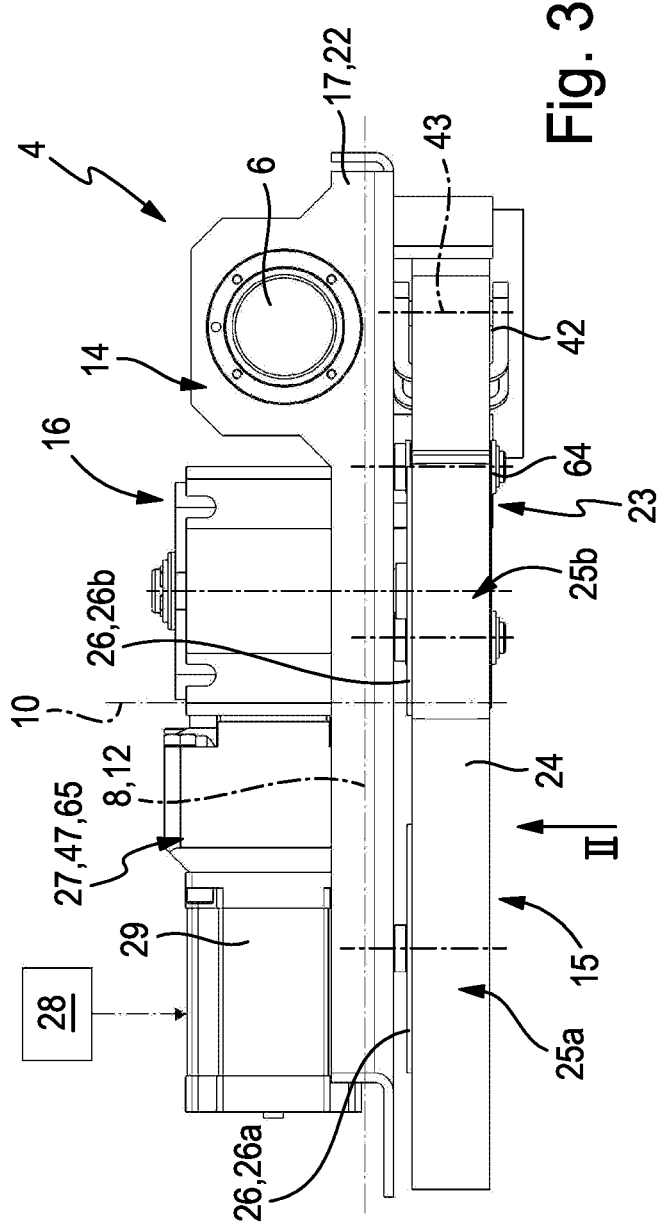

For rendering such a functionality possible, it is advantageous if the release deflection element 42 is biased by spring force by way of a spring device 55 into a gripping position which is evident from FIGS. 2 and 4 and in which the gripping section 35 which is wrapped around the release deflection element 42 is in the position of coming into contact in an adhering manner with the object 2 which is positioned in the working region 34. Given the release action, by way of activating the drive unit 47, the release deflection element 42 whilst overcoming the spring force of the spring device 55 can be pressed back into a release position which is lifted from the object 2 and is evident in FIG. 5.

Concerning an embodiment example which is not illustrated, the release drive unit 47 is designed separately and independently of the tape transport drive unit 27.

The adhesion gripping device 4 according to FIGS. 2 to 5 comprises an object support device 52 which is arranged in the working region 34 and is with one or more support elements 56 which are arranged on the support structure 14 in a stationary manner. The at least one support element 56 flanks or frames the working region 34 and has a support surface 57 for the object 2, said support surface facing in the same direction as the adhesion surface 33 of the gripping section 35. In the gripped and firmly held state, the object bears on the support surface 57. If, given the release action, the gripping section 35 which is subjected to the tensile force 54 is forced back together with the release deflection element 42 with respect to the plane of the support surface 57, then the object 2 is held back by the at least one support element 56, so that a separation of the adhesive connection takes place. As a result, the object 2 which is no longer firmly held can drop downwards or be deposited according to the arrow 58 in FIG. 5.

The at least one support surface 57 is expediently orientated to the bottom in the height direction 9. Accordingly, the release movement 46 runs oppositely in the direction of the upper side 18. Given an embodiment example which is not shown, the deflection element movement 45 and thus also the release movement 46 is orientated precisely in the height direction 9. However, it is advantageous if it runs lying in the main pane 12 in an inclined manner with respect to the height axis 9 in accordance with the illustrated embodiment example.

The movable mounting of the release deflection element 42 with regard to the embodiment example of FIGS. 2 to 5 is preferably realised by way of a bearing element 62 through which a shank of a deflection element carrier 63 carrying the release deflection element 42 passes in a slidingly movable manner, being attached to the support structure 14, wherein a spring device 55 which is designed as a compression spring is integrated between the deflection element carrier 63 and the bearing element 62.

In order to achieve a favourable course for the adhesion tape 24 which extends in the main plane 12, further deflection elements 64 which are formed for example by deflection rollers or by deflection rods can be present on the support structure 14.

For each gripping unit 23, it is the case that a tape turning device which is not shown further and by way of which the adhesion tape 24 is turned by 180 degrees with respect to its longitudinal axis, in order to prevent it from coming into contact with its adhesion surface 33 with any of the deflection elements, can be arranged in the course of the tape of the adhesion tape 24 between the two holding regions 25a, 25b.

The adhesion gripping device 4 of the FIGS. 2 to 5 in particular is designed such that the release deflection element 42 in the non-actuated state is biased by way of the spring device 55 into a gripping position which is evident from FIG. 2 and in which together with the gripping section 35 which wraps it, it projects partially beyond the support surface 57. The consequence of this is that given the application movement 37, the gripping section 35 comes into contact with the object 2, before this object bears on the support surface 57. Preferably, in a further method step, the application movement 37 is then continued, until the object 2 which for its part is supported by the supply device 3 bears on the support surface 57, wherein with this procedure the release deflection element 42 is pressed back into a further gripping position whilst carrying out the deflection element movement 45. This procedure is expediently combined with a simultaneous post-tensioning of the adhesion tape 24 by way of actuating the release drive unit 47, so that the release deflection element 42 also retains this further gripping position even if, in a subsequent operating phase, the object 2 is lifted together with the adhesion gripping device 4 from the supply device 3. This operating phase is shown in FIG. 4.

Figure 5:
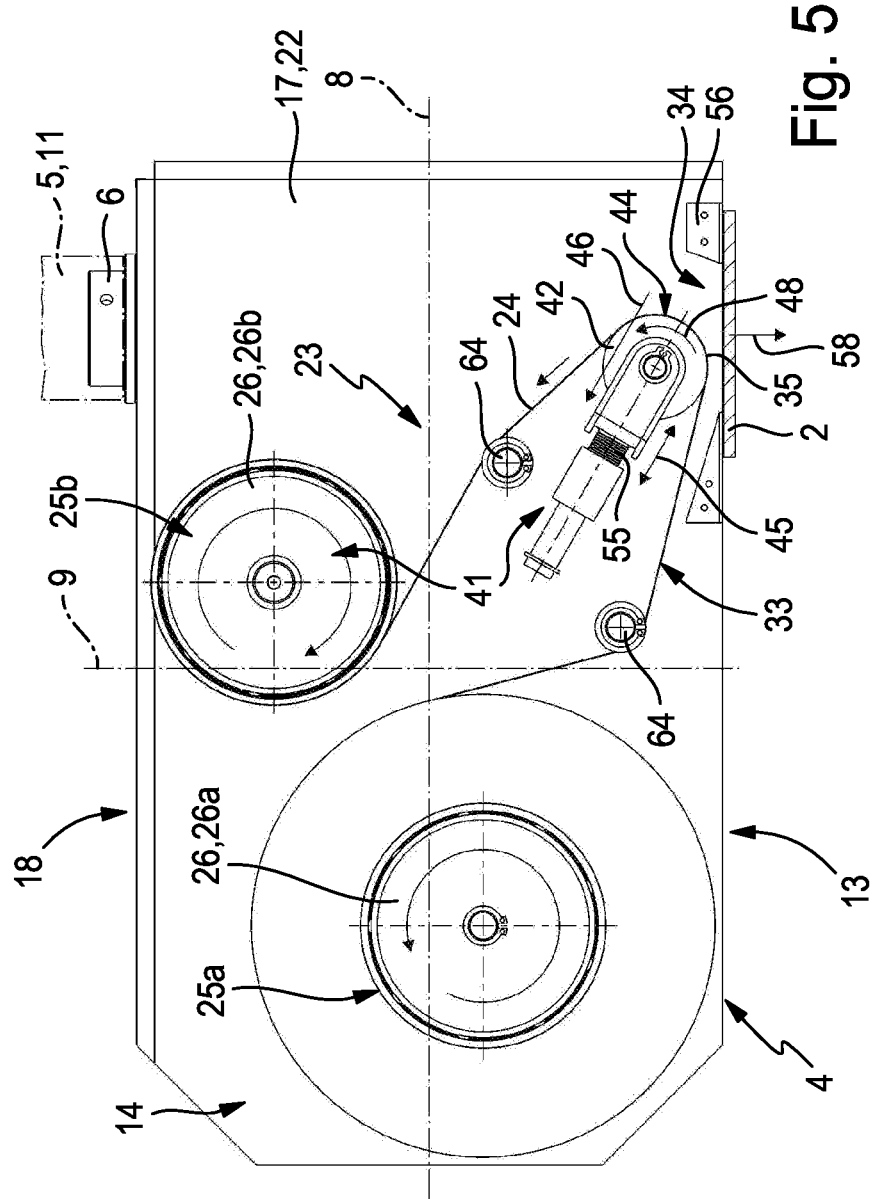

If the object is to be deposited, then according to FIG. 5 the already described release action is started, wherein the release deflection element 42 is pressed into the release position according to FIG. 5 amid the complete lifting of the object 2 which is held back by the object support device 52.

The adhesion gripping device 4 can be designed such that the release deflection element 42, in the state of the object being firmly held by the gripping section 35, can be moved away from the gripping section 35 of the adhesion tape 24 and is only applied onto the gripping section 35 again for carrying out a release action. However, the illustrated construction if preferred, concerning which the release deflection element 42 is in constant contact with the gripping section 35.

In order to subsequently prepare the adhesion griping device 4 for a renewed gripping procedure, the release drive unit 47 can be actuated in a manner such that the tensile force 54 is reduced or completely eliminated, so that the release deflection element 42 together with the gripping section 35 which wraps it can be moved back into the initial gripping position in the direction opposite the release movement 46.

Inasmuch as this is concerned, concerning the embodiment example of FIGS. 2 to 5, the release drive unit 47 is a constituent of a gripping drive unit 65 by way of which not only can the movements for the release procedure be created, but also movements of the components of the adhesion gripping device 4 which are related to the gripping procedure.

Whereas concerning the embodiment example of FIGS. 2 to 5, the gripping unit 23 with its working region 34 with the release deflection element 42 only comprises a single deflection element for the adhesion tape 24, around which deflection element the gripping section 35 extends with an bent longitudinal course, FIGS. 6 to 18 show an embodiment example, concerning which at least one and preferably each gripping unit 23 in its working region 34 additionally to the release deflection element 42 comprises a further deflection element 66. The further deflection element 66, as the release deflection element 42, lies in the main plane 12, wherein it is distanced to the release deflection element 42. It is partially wrapped by the adhesion tape 24 just as the release deflection element 42. The gripping section 35 in the assigned working region 34 therefore extends in an in particular longitudinal course between the release deflection element 42 and the further deflection element 66.

The further deflection element 66 can be designed in a non-rotatable manner and have a deflection surface, on which the adhesion tape 24 bears with its rear surface is a slidingly movable manner. However, the solution which is realised with the illustrated embodiment example is preferred, concerning which the further deflection element 66 is also designed as a deflection roller 66a which is rotatable relative to the support structure 14 about a rotation axis which is at right angles to the main plane 12. The rotation axis coincides with the longitudinal axis of the deflection roller 66a. The deflection roller 66a which forms the further deflection element 66 expediently has no drive and is designed in a freely rotatable manner.

The release deflection element 42 and the further deflection element 66 are preferably designed and arranged such that the gripping section 35 which extends between them runs in the working plane 36 which has already been discussed above. Preferably, the gripping sections 35 of all working regions 34 which have a linear longitudinal course lie in a common working plane 36. With respect to the height direction 9, they therefore lie at the same height of the adhesion gripping device 4.

Whereas however the release deflection element 42 is in the position of carrying out a to and fro deflection element movement 45 which is translatory relative to the support structure, the further deflection element 66 is expediently arranged in a fixed and consequent stationary manner with respect to the carrier structure 14. The deflection element movement 45 of the release deflection element 42 therefore depending on the movement direction expresses itself either in an approach onto the further deflection element 66 or in a moving-away from the further deflection element 66. Herein, the approach movement forms the release movement 46.

The deflection element movement 48 by way of example is a linear movement in the main direction 8.

A position of the release deflection element 42 which is approached maximally onto the further deflection element 66 is hereinafter denoted as the release position and the position of the repose deflection element 42 maximally distanced to the further deflection element 66 as the gripping position. Given an embodiment as a deflection roller 42*a*, the deflection element movement 45 is at right angles to the rotation axis 43 of the deflection roller 42*a* with all embodiment examples.

According to a non-illustrated embodiment example, the several gripping units 23 of the adhesion gripping device 4 are designed independently of one another and each comprise an individual adhesion tape 24. In each of these gripping units 23 which are independent of one another, the adhesion tape 24 runs between two holding regions 25*a*, 25*b* which are individually assigned to the respective gripping unit 23 and are preferably provided with winding rollers 26 in the outlined manner. An adhesion gripping device 4 which is constructed on this basis can comprise for example several gripping sections 35 of the type which is described by way of FIGS. 2 to 5.

Even if the gripping units 23 according to the embodiment example of FIGS. 6 to 18 each comprise several deflection elements 42, 66 which are assigned to the working region 34, the design of the several gripping units 23 independently of one another is possible. In contrast to the design principle of FIGS. 2 to 5, here however the adhesion surface 33 which is active with the gripping procedure is somewhat larger with regard to magnitude, so that higher holding forces can be transmitted.

According to the embodiment example of FIGS. 6 to 18, each release deflection element 42 can be arranged or designed in a stationary manner on a holding element 67 which is separate with respect to the support structure 14, wherein the holding element 67 is movable relative to the support structure 14, in order to synchronously generate the deflection element movement 45. Each holding element 67 can carry out a to and fro holding unit movement 68 which is indicated by a double arrow, relative to the support structure 14, the length and direction of said movement directly defining the length and direction of the deflection element movement 45 of the release deflection element 42 which is seated on the holding unit 67.

Each gripping unit 23 has its own holding unit 67 which carries the assigned release deflection element 42.

Expediently, each holding unit 67 is movably mounted on the support structure 14 in a manner which permits the execution of the holding unit movement 68. Suitable mounting means are recognisable in the drawing at 72 and by way of example define a linear guide. At least one mounting projection 72*a* which is formed on the holding unit 67 immerses into a mounting groove 72*b* of the support structure 14 in a manner in which it is displaceable in the main direction 8 and supported in the height direction 9. Hereby, a sliding mounting or a rolling mounting can be selectively realised.

The two holding units 67 lie opposite one another in the main direction 8, so that they can approach one another and distance themselves from one another in the main direction 8 by way of their main unit movements 68.

By way of example, each holding unit 67 comprises two holding elements 67*a*, 67*b* which are arranged distanced to one another in the transverse direction 10 and which are firmly connected to one another by way of suitable connection means. These holding elements 67*a*, 67*b* are expediently designed in a plate-like manner and are aligned with the plate plane which is parallel to the main plane 12. The respective one holding element 67*a* is mounted on the front side of the intermediate element 14*b* which faces the front carrier element 14*a*, via the mounting means 72. The respective other holding element 47*b* is mounted on the part section 14*b*' of the rear carrier element 14*b* on its rear side which is opposite to the front carrier element 14*b*, said part section lying opposite the intermediate element 14*d*. Each release deflection element 42 is seated between the two holding elements 67*a*, 67*b* and is expediently simultaneously held or mounted on both holding elements 67*a*, 67*b*.

The further deflection elements 66 also bridge the distance which is defined between the two holding elements 67*a*, 67*b*, but are each attached to the intermediate element 14*d* and to the part section 14*b*' of the rear carrier element 14*b* which lies opposite this intermediate element.

A gripping device drive unit which for differentiation from those of the embodiment examples of the FIGS. 2 to 5 is provided with the reference numeral 73 is attached to the support structure 14 and with regard to drive its coupled to the holding units 67 in a manner such that it can create their holding unit movements 68 and consequently also the deflection element movements 45 of the release deflection elements 42 which are arranged on the holding units 67.

The gripping device drive unit 73 preferably has a drive unit 74 which is actuatable electrically and/or by fluid force and which with the embodiment example is formed by a pneumatic cylinder which is operated with pressurised air. The drive unit 74 is fastened to the support structure, by way of example on the yoke element 14*e* in the region of the upper side 18.

The drive unit 74 with regard to control is connected to the electronic control device 28, by way of which it can be controlled with regard to operation. Given a fluid-actuated drive unit 74, a control valve device which is not illustrated further is connected between the control device 28 and the drive unit 74.

The drive unit 74 comprises a driven member 75 which is movable relative to the support structure 14 in an electrical manner or by way of fluid force. By way of example, it comprises a piston rod which projects downwards in the height direction 9 and which is fastened to a piston, wherein the piston is displaceably received in a cylinder housing of the drive unit. The piston can be impinged by pressurised air for generating the driven movement 82. The control is assumed by the electronic control device 28.

The driven member 75 with regard to drive is coupled to the two holding units 67 via a coupling gear 76 which is preferably arranged in the region between the two holding units 67. By way of example the coupling gear 67 comprises two coupling levers 77 which are each pivotably connected on the one hand at an articulation point 83 to the driven member 75 and on the other hand to one of the holding units 67.

The coupling gear 76 can be arranged on the driven member 75 in a direct manner. However, the exemplary solution is preferred, concerning which the driven member 75 engages in a force-transmitting manner on an intermediate element which is denoted as a control element 78 and on which in turn the coupling gear 76 and by way of example the two coupling levers 77 are mounted.

The control element 78 is mounted on the support structure 14 in a displaceable manner in the height direction. By way of this, it can participate directly in the to and fro driven movement 82 of the driven member 75 which can be set by the electronic control device 28 and which is indicated by the double arrow, as a control movement 79.

Figure 12:
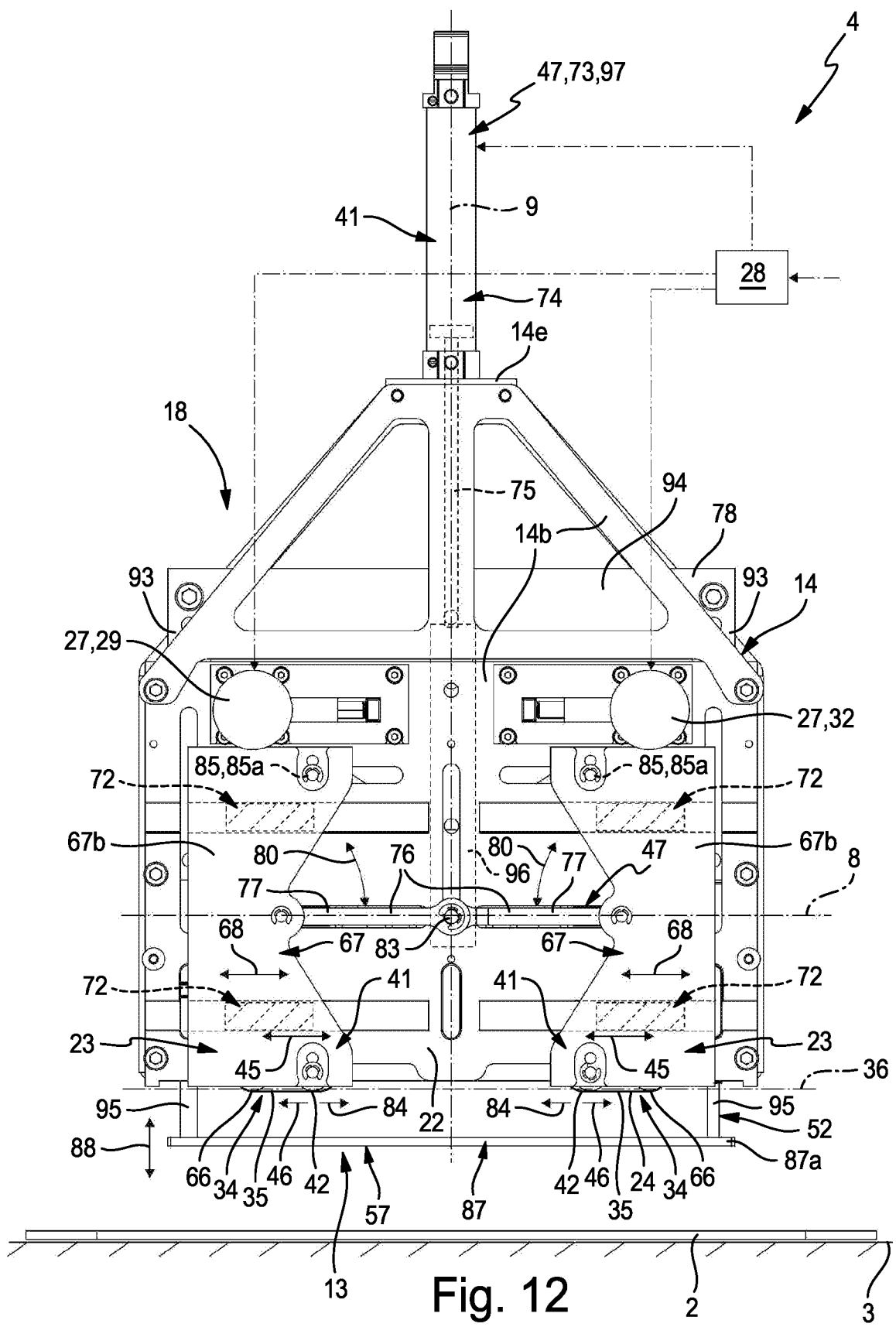

Given the driven movement 82, the articulation point 83 of the coupling levers 77 which is arranged on the control element 78 is displaced to the top or bottom, so that the coupling levers 77 are each driven at one end and are pivoted according to the arrows 80 in FIG. 12. By way of this, whilst carrying out the holding unit movement 68, the two holding units 67 are either pulled to one another for the mutual approach or are pressed away from one another for the mutual distancing.

The two holding units 67 with regard to movement are synchronised with one another by way of the coupling gear 76 in a manner such that they are each movable to one another relative to the support structure 14 for creating the release movements 46 of the two release deflection elements 42.

In the operating phases which are evident from the FIGS. 6 to 14 as well as 17 and 18, the holding units 67 are distanced to one another amid the assumption of a basic position. Here, the release deflection elements 42 simultaneously assume their release position. The FIGS. 15 and 16 show an operating phase with holding units 67 which have approached one another amid the assumption a working position, in which the release deflection elements 42 assume their gripping position.

If the two holding units 67 distance themselves to one another given the holding unit movement 68, this within each gripping unit 23 entails a release movement 46 of the release deflection element 42. The release deflection elements 42 move out of the gripping position which is shown in FIG. 15, into the release position which can be seen from FIGS. 13 and 14. This entails a shortening of the gripping section 35. Herein, the already mentioned circulating movement 48 of each gripping section 33 around the assigned release deflection element 42 is effected at the same time, by way of which movement the shortening of the gripping section 35 is compensated and the gripping section 35 is simultaneously pulled away from the object 2 adhering thereto.

Figure 6:
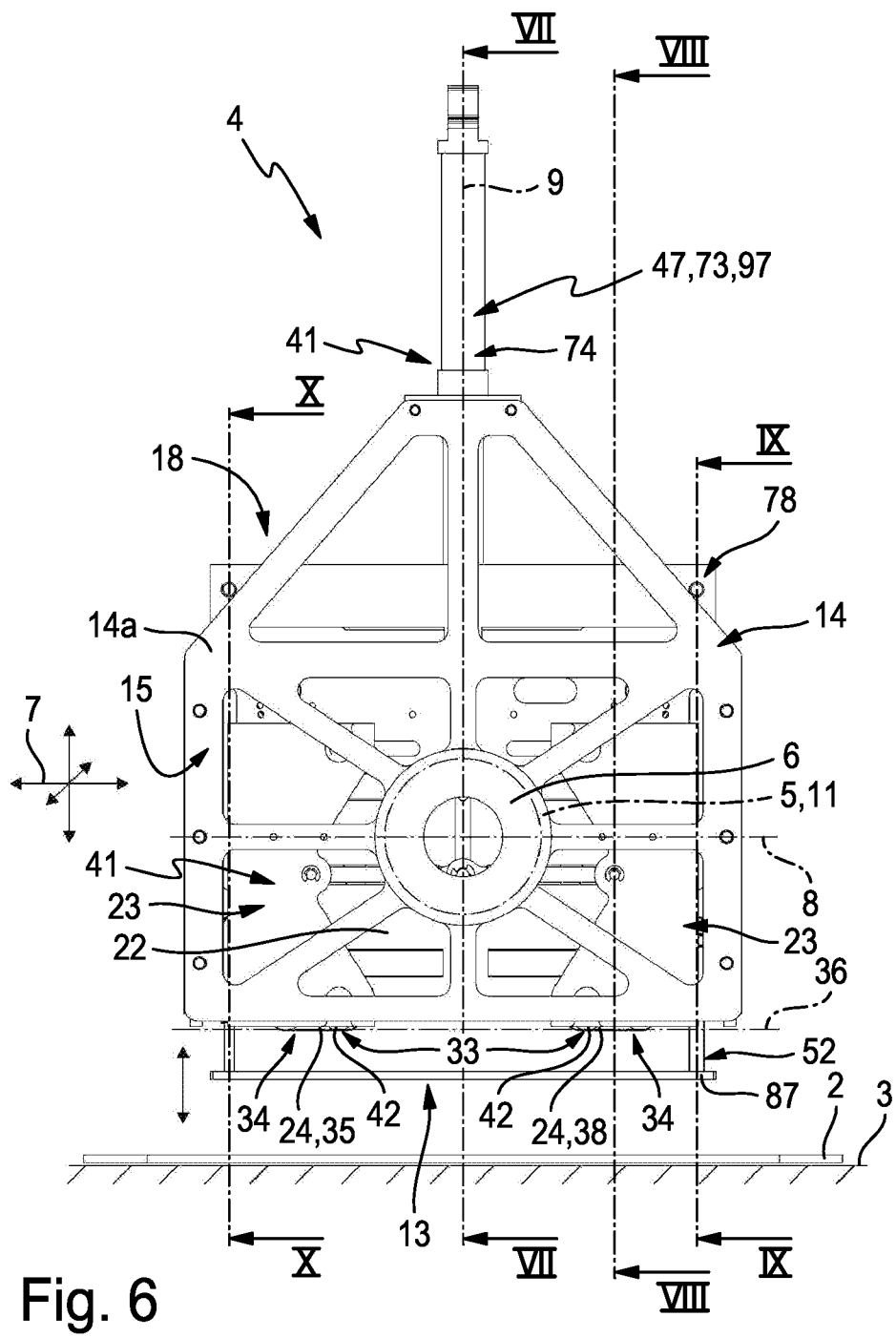
Figure 7:
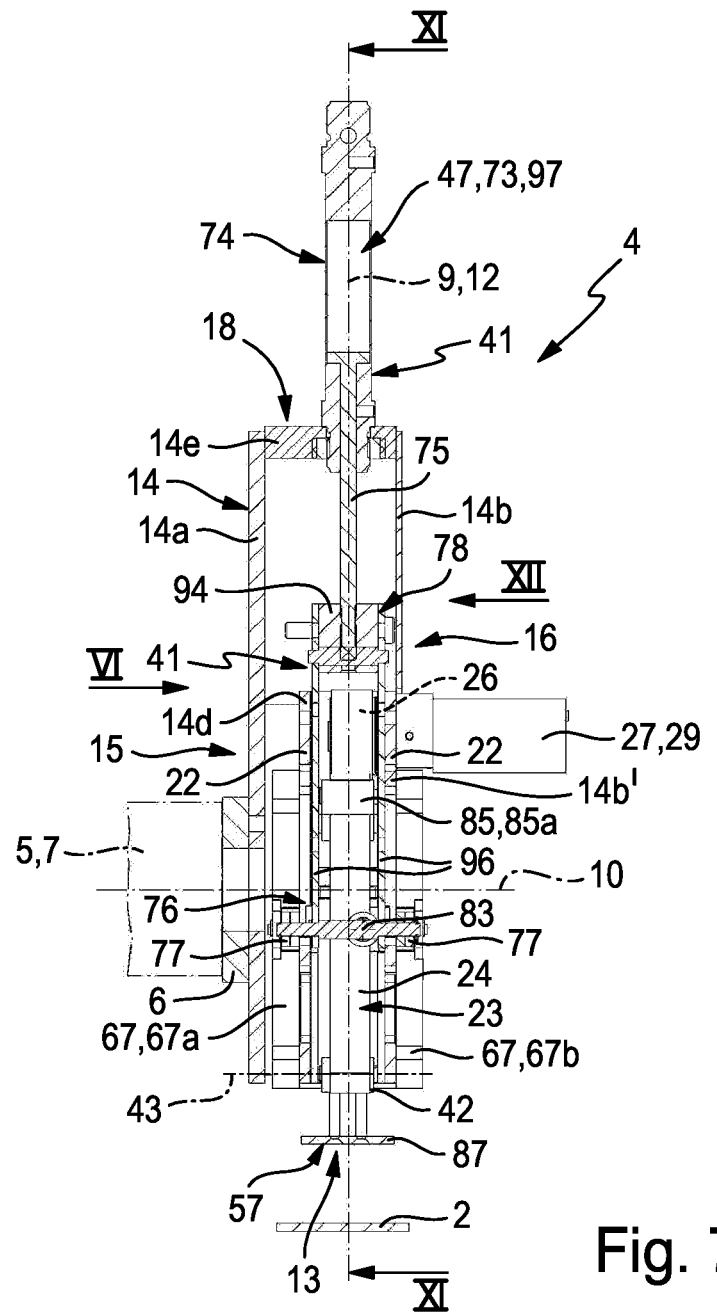
Figure 8:
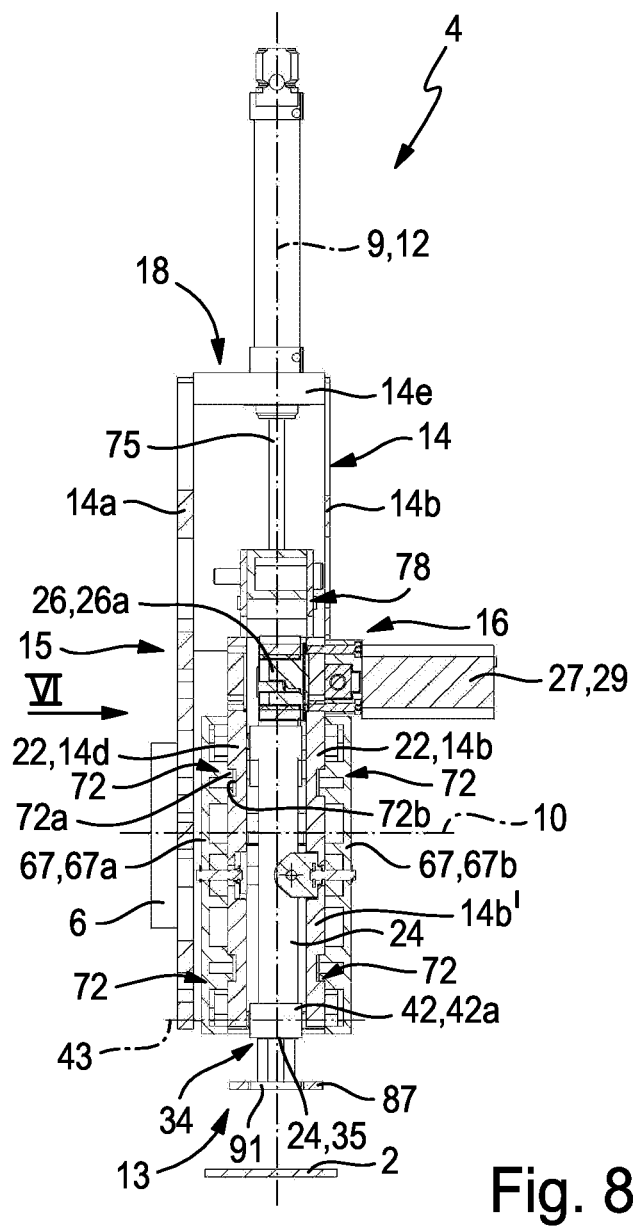
Figure 9:
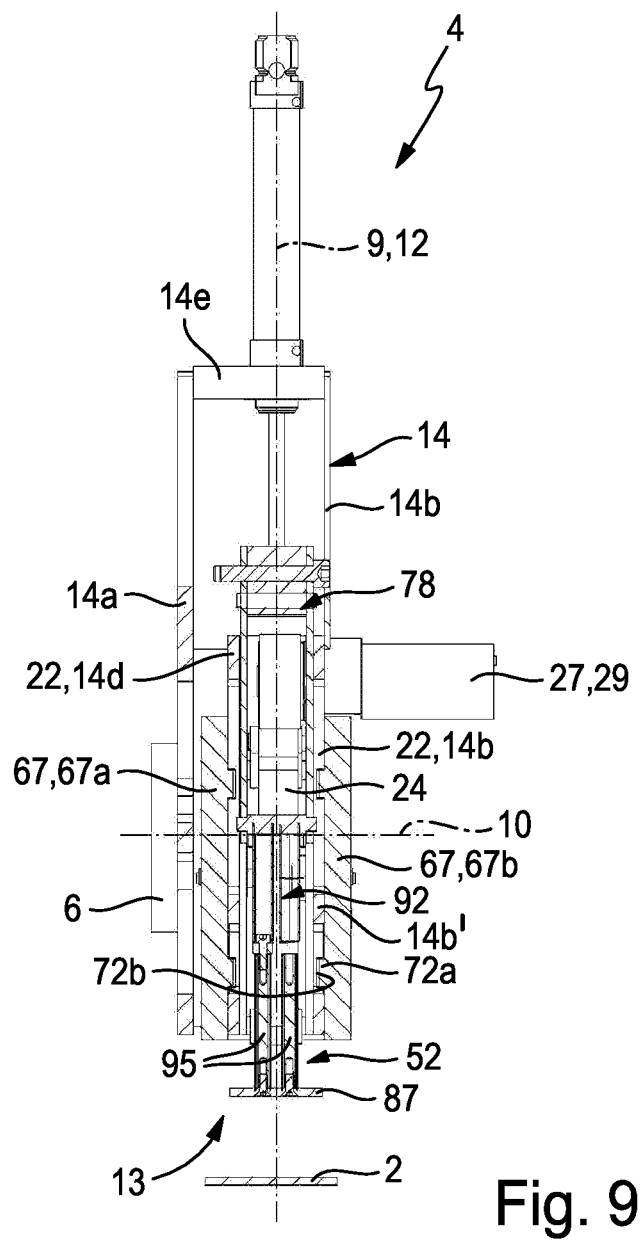
Figure 10:
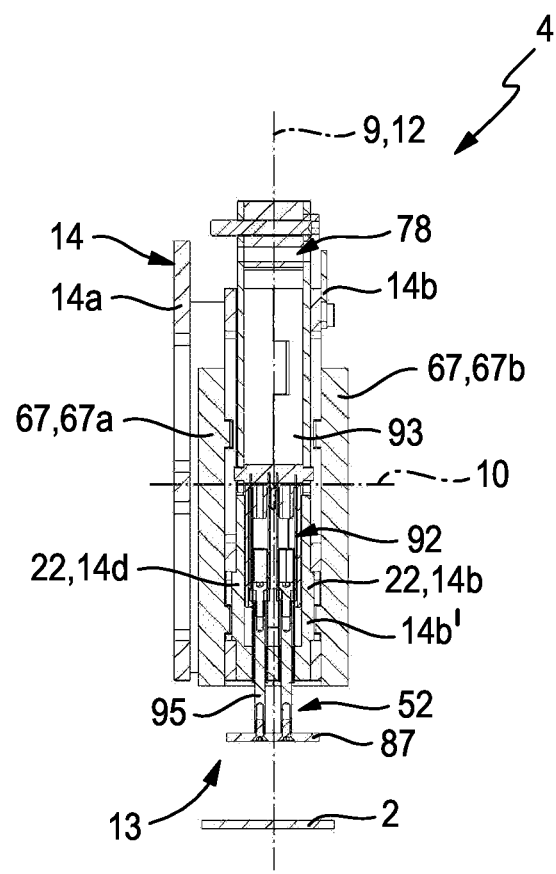

Since this release action can be created by the gripping device drive unit 73, this with regard to the embodiment example of FIGS. 6 to 8 also directly defines the release drive unit 47 according to the invention. Furthermore, the gripping device drive unit 73, as explained, is also on the position of creating a movement of the release deflection elements 42 which is opposite to the release movement 46 and which can be carried out and is carried out for gripping an object 2 and is designed such that one can speak of a gripping movement which is indicated by an arrow in the drawing. The gripping movement 84 takes place at the transition between the third operating phase which is shown in FIGS. 13 and 14 and the fourth operating phase which is illustrated in the FIGS. 15 and 16.

Differently to the embodiment example of FIGS. 2 to 5, concerning the embodiment example of FIGS. 6 to 18 the release movement 46 can be produced independently of the adhesion tape 24, specifically by the active displacement of the release deflection element 42 on account of its drive coupling to the release drive unit 47 which is to say to the gripping device drive unit 73.

Concerning an advantageous embodiment which is realised with the embodiment example of FIGS. 6 to 18, several gripping units 23 have a common adhesion tape 24. By way of example, an adhesion tape 24 which runs between two holding regions 25a, 25b is therefore commonly assigned to the two gripping units 23. The two gripping sections 35 therefore have corresponding holding regions 25a 25b for the common adhesion tape 24.

One and the same adhesion tape 24 is passed through the working region 34 of both gripping units 23. The gripping sections 35 which pass through the two working regions 35 are therefore formed by longitudinal sections of one and the same adhesion tape 24 which are distanced to one another in the tape length direction.

Various additional deflection elements 85 for the adhesion tape 24 which are present additionally to the release deflection elements 42 and to the further deflection elements 66 are arranged on the support structure 14 and/or on the holding units 67 in a manner lying in the main plane 12 such that a tape longitudinal course which is favourable for carrying out the gripping procedure and the release procedure sets in. In particular, the additional deflection elements 85 are arranged such that the length of the length section of the adhesion tape 24 which extends between the two holding regions 25a, 25b does not change given a holding unit movement 68. By way of this, the length change of the gripping sections 35 can be effected in combination with the circulating movement 48 without a change of the tape tension of the adhesion tape 24.

Preferably, an additional deflection element 85 which is denoted as a holding unit deflection element 85a is present on each holding unit 67, around which deflection element the longitudinal section of the adhesion tape 24 which extends between the two release deflection elements 42 is wrapped. Concerning these two holding unit deflection elements 85a, a mutual approach or a mutual distancing takes place to the same extent as with the release deflection elements 42 during the holding unit movement 68. Whereas with regard to the mutual approach the length of the two gripping sections 35 increases, the length of the longitudinal section of the adhesion tape 24 which extends between the two holding unit deflection elements 85a and which is denoted as the intermediate section 68 simultaneously reduces. Given an opposite holding movement 68, the length of the intermediate section 68 increases to the same extent as the length of the gripping sections 35 in sum shortens. By way of this longitudinal compensation, one succeeds in the tape tension which is set by the tape transport drive unit 27 remaining constant.

Concerning the embodiment example of FIGS. 6 to 18, the adhesion tape 24 has an essentially W-shaped course between the two holding regions 25a, 25b. The holding regions 25a, 25b are located at the free ends of the two outer limbs of the W. The two working regions 34 are located in the transition regions of the outer limbs each to an inner limb of the W. The intermediate section 86 is assigned to the transition region between the two inner limbs of the W.

The object support device 52 which has already been mentioned above, concerning the embodiment example of FIGS. 6 to 18 is designed in a manner such that the object 2 to be gripped as well as the gripped object 2 can be supported by it. In contrast to the embodiment of FIGS. 2 to 5, this object support device 52 comprises at least one and preferably exactly one movable support element 87 which can execute a linear travel movement 88 relative to the support structure 14, said movement being indicated by a double arrow, wherein the movement direction expediently runs in the height direction 9 and in particular has the same alignment as the control movement 79 of the control element 78 which can be created by the driven movement 82 of the gripping device drive unit 73.

The movable support element 87 is located in the proximity of the two working regions 34, ahead of which in the height direction 9 it is arranged in the region of the lower side 13. In a lower view of the adhesion gripping device 4, the movable support element 87 extends next to the working regions 34 and in particular around the working regions 34. A movable support element 87 which is commonly assigned to both working regions 34 expediently comprises a window-like opening 91 in each region which lies opposite a working region 34 in the height direction 9, said opening permitting the passage of the assigned gripping section 85, the release deflection element 42 and the further deflection element 66.

The movable support element 87 at its lower side which is away from the gripping units 23 defines at least one support surface 57 for the object 2.

Within the framework of the linear travel movement 88, the movable support element 87 can be selectively displaced in an extended position 87*a* which is moved to the bottom away from the working regions 34 and in a retracted position 87*b* which is approached to the working regions 34.

The movable support element 87 can be arranged directly on the support structure 14 in a movable manner with respect to this. However, what is preferred in the illustrated embodiment, concerning which the movable support element 87 is displaceably mounted on the control element 78 in the height direction 9. The control element 78 therefore functions as a constituent of the object support device 52.

Preferably, a spring device 92 which consist of one or more spring units is integrated between the movable support element 87 and the control element 78, said spring device by way of example being designed as a compression spring device and by way of which the movable support element 87 is constantly biased into the extended position 87*a*.

By way of example, the control element 78 comprises two in particular column-like or rod-like outer control limbs 93 which are assigned to the end regions of the support structure 14 which are orientated in the main direction, said limbs starting from a connecting section 94 of the control element 78 which extends in the main direction 8 and is assigned to the upper side 18 projecting downwards in the height direction. The outer control limbs 93 extend in a displaceable manner, in particular in the inside of the support structure 14. The driven member 75 preferably engages on the connecting section 94.

The movable support element 87 is displaceably mounted in the height direction 9 in each outer control limb 93 by way of at least one guide column 95 which engages from below in a slidingly displaceable manner. The spring device 92 expediently acts between an outer control limb 93 and the guide column 95 which is assigned to this outer control limb 93.

The articulation point 83 for the coupling gear 76, mentioned above, is expediently arranged on an inner control limb 96 of the control element 78 which departing from the connection section 94 extends downwards between the two outer control limbs 93 into the support structure 14.

Stop means on the control element 78 and on the guide columns 95 and which cooperate with one another delimit the extension travel of the movable support element 87 with respect to the outer control limb 93.

Thus not only can the holding unit movements 68 be controlled by the control movement 79, but also the linear travel movement 88 of the movable support element 87. As long as the movable support element 87 is not externally stopped, it participates in the control movement 79 of the control element 78.

Figure 11:
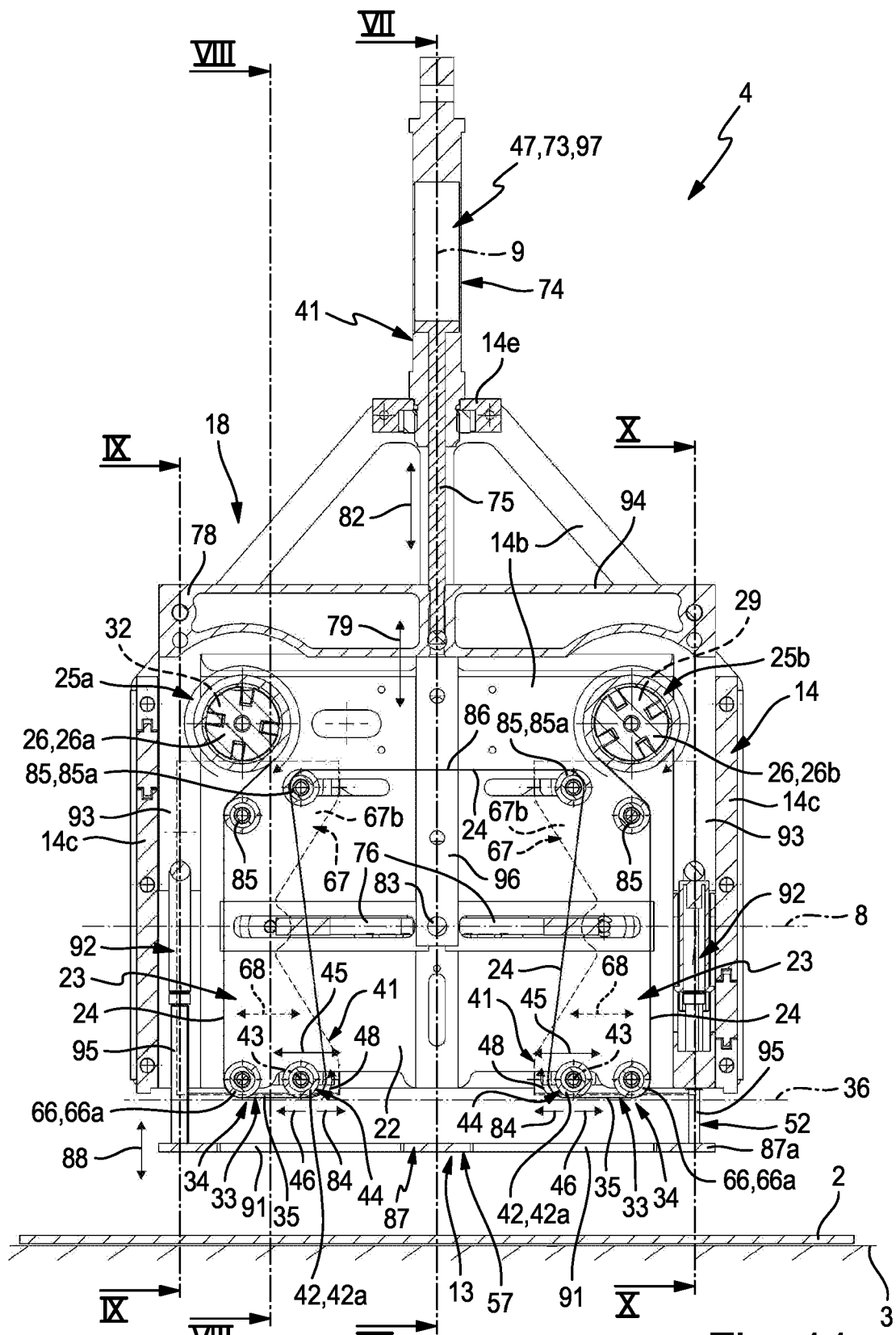

Within the framework the control movement 79, the control element 78 can be selectively positioned in a first control position which is lowered relative to the support structure 14 and which is evident for example in the FIGS. 11 and 12, and in a second control position which is moved up with respect to support structure 14 and is evident from the FIGS. 15 and 16. In the first control position, the non-impinged movable support element 87 is located in the extended position 87*a*, whereas it assumes the retracted position 87*b* in the second control position of the control element 87*b*. The release deflection elements 32 are located in the release position during the first control position and in the gripping position in the second control position.

The aforementioned embodiments show that the linear travel movement 88 of the movable support element 87 can be influenced and in particular also created by way of the gripping device drive unit 7, so that the gripping device drive unit 73 also functions as a linear travel drive unit 97 for the linearly movable support element 87.

If the control element 78 is located in the first control position, then the movable support element 87 can also be brought into the retracted position 87*b* without an actuation of the control element 78, by way of it being impinged by an external force which acts in the retraction direction and which in particular can be created by way of the adhesion gripping device 4 being applied with a leading movable support element 78 onto the object to be gripped 2 within the framework of the application movement 37 according to FIGS. 13 and 14.

By way of example, the holding unit movements 68 and the linear travel movements 88 are commonly produced by way of the linear travel drive unit 97. However, it is to be understood that one can also provide drive means which are separate from one another for producing these two movements.

A preferred operational sequence for repositioning an object 2 amid the application of the adhesion gripping device 4 which is illustrated in FIGS. 6 to 18 is explained hereinafter. The operational sequence is controlled by the electronic control device 88.

In a first operating phase which is evident from the FIGS. 6 to 12, the object 2 which is to be repositioned is deposited on a supply device 3 and the adhesion gripping device 4 is placed at a distance above the object 2 by way of the positioning device 5. The control element 78 is located in the first control position, so that the release deflection elements 42 assume the release position and the movable support element 87 assumes the extended position.

In the subsequent second operating phase which is evident from FIGS. 17 and 18, the adhesion gripping device 4 is lowered amid the execution of the application movement 37 of the handing movement 7, until the movable support element 87 comes to bear on the object 2 which as was hitherto the case is vertically supported by the supply device 3 which is not shown further here.

In the subsequent third operating phase, the application movement 37 is continued by the positioning device 5, wherein the control element 78 is held in the first control position as was hitherto the case. As a result of this, the movable support element 87 is displaced into the retracted position whist carrying out a retracting linear travel movement 88. By way of this, the two gripping sections 35 with the adhesion surface 33 located thereon simultaneously come to bear on the object. The gripping sections 35 can herein enter through the window-like openings 91.

Beginning with this third operating phase, the control element 79 is displaced out of the first control position into the second control position which is evident from FIGS. 15 and 16, by way of the control movement 79. The fourth operating phase which is evident from the FIGS. 15 and 16 results from this. Given the transition between the third operating phase to the fourth operating phase, the release deflection elements 42 have carried out the gripping movement 84, so that the length of the gripping sections 35 which adhesively bear on the object 2 has increased. The contact surface is now at all events sufficiently large, in order to be able to lift and firmly hold the object 2.

In the fourth operating phase, the control element 78 has displaced upwards relative to the movable support element 78, so that the spring device 92 has relaxed and the movable support element 87 which is located in the retracted position 87b also remains in this retracted position 87b without an externally acting support force.

In a manner which is not illustrated further, the firmly held object can now be displaced in space by way of carrying out arbitrary handling movements 7 of the adhesion gripping device 4.

The object 2 which was hitherto firmly held is subsequently detached from the gripping sections 35 at the desired target point of the handling movement 7 and is deposited onto an underlay.

The initial procedure of this depositing again corresponds to the illustration in FIGS. 15 and 16, only with the difference that here the object 2 still adheres to the gripping sections, whereas with the preceding gripping procedure it is gripped by the gripping sections 35 by way of the illustrated measure.

In the subsequent fifth operating phase which is illustrated in FIGS. 13 and 14, the release action which has already been outlined above in detail is carried out. Herein, the adhesion tape 24 is pulled away from the object 2, so that the remaining contact surface which continues to act adhesively is small enough, in order to completely release the object 2 from the adhesion tape 24 in a subsequent sixth operating phase which is evident from FIGS. 17 and 18.

This finalising release procedure by way of example results automatically by way of the adhesion gripping device 4 being lifted from the object 2. During the release action according to FIGS. 13 and 14, the control element 78 was brought into the first switching position which had the result of the spring device 92 being loaded, since the movable support element 87 is supported by the object 2 which lies on the underlay. If now according to FIGS. 17 and 18 the adhesion gripping device 4 is lifted, then initially only the support structure 14 together with the gripping units 23 lifts from the object 2, whereas the movable support element 87 remains in bearing contact on the object 2 since the loaded spring device 92 is active. On lifting the support structure 14 from the object 2, a linear travel movement 88 of the movable support element 87 relative to the support structure 14 into the extended position 87, caused by the spring device 92 therefore take space, and the object 2 is held back by way of this. As a result, the gripping sections 35 are pressed away and detached from the object 2 by way of the spring force of the spring device 92.

The invention claimed is:

1. A handling device for repositioning objects with an adhesion gripping device which comprises a support structure, on which a fastening interface for fastening the adhesion gripping device to a positioning device is formed, by way of which positioning device the adhesion gripping device is movable and positionable whilst carrying out a handling movement, with at least one gripping unit which is arranged on the support structure and which comprises a supple adhesion tape which extends in a main plane of the adhesion gripping device between two holding regions which are distanced to one another, at least on one side comprises an adhesion surface and has a longitudinal section, said longitudinal section being passed through a working region of the gripping unit and forming a gripping section by way of which an object to be repositioned can be gripped and firmly held in a releasable manner in the working region by way of an adhesion action of the adhesion surface wherein the adhesion gripping device comprises a release device which is designed for releasing an object which is gripped by the gripping section of the adhesion tape, said release device comprising at least one release deflection element which is arranged in the working region of the gripping unit, is partially wrapped by the adhesion tape and is translationally movable relative to the support structure in the main plane for carrying out a release movement, and further comprising a release drive unit which is arranged on the support structure and by way of which a circulating movement of the gripping section around the release deflection element can be created, said circulating movement being accompanied by the release movement of the release deflection element and effecting an active pulling-away of the adhesion tape from the gripped object, wherein the adhesion gripping device comprises several gripping units which are arranged on the support structure and which each comprise a separate working region through which a gripping section of an adhesion tape is passed and to which an individual release deflection element is assigned, and wherein the working regions of several gripping units are arranged distanced to one another in a main direction which is parallel to the main plane of the adhesion gripping device.

2. The handling device according to claim 1, wherein the adhesion tape is a self-adhesive tape whose adhesion surface is formed by a self-adhesive surface.

3. The handling device according to claim 1, wherein the adhesion tape in each of the two holding regions is wound around a winding roller which is rotatable with respect to the support structure about a rotation axis which is at right angles to the main plane, wherein the winding roller in one of the two holding regions is a wind-off roller which provides the non-consumed adhesion tape and the winding roller in the other of the two holding regions is a wind-up roller which receives the consumed adhesion tape.

4. The handling device according to claim 3, wherein each gripping unit comprises a tape transport drive unit by way of which the adhesion tape can be driven into a transport movement which effects its discontinuous winding-over from the wind-off roller onto the wind-up roller.

5. The handling device according to claim 1, wherein the release deflection element comprises an arcuately bent deflection surface which is wrapped by the adhesion tape.

6. The handling device according to claim 1, wherein the release deflection element is designed as a deflection roller which is rotatable with respect to the support structure about a rotation axis which is at right angles to the main plane.

7. The handling device according to claim 1, wherein at least one of the several gripping units is displaceable and positionable relative to the support structure and to at least one further gripping unit, in a manner allowing different relative positions of the working regions of several gripping units to be set.

8. The handling device according to claim 1, wherein the several gripping units are designed independently of one another and each have an individual adhesion tape, wherein each adhesion tape runs between two individually assigned holding regions of the support structure.

9. The handling device according to claim 1, wherein an adhesion tape which runs between two holding regions of the support structure is commonly assigned to several gripping units of the adhesion gripping device, wherein the adhesion tape has several gripping sections formed by longitudinal sections of one and the same adhesion tape type, which are distanced to one another and is passed through the working region of each of the several gripping units with one of the several gripping sections.

10. The handling device according to claim 1, wherein the release deflection element is the only deflection element for the adhesion tape which is present in the working region of at least one gripping unit, wherein the gripping section of the adhesion tape extends around the release deflection element with an arcuate longitudinal course.

11. The handling device according to claim 1, wherein at least one gripping unit in its working region, additionally to the release deflection element comprises a further deflection element for the adhesion tape, said further deflection element being distanced with respect to the release deflection element in the main plane of the adhesion gripping device and being partially wrapped by the adhesion tape, wherein the gripping section of the adhesion tape extends between the release deflection element and the further deflection element and wherein given the release movement the distance between the release deflection element and the further deflection element reduces.

12. The handling device according to claim 11, wherein the further deflection element is a stationary deflection element which is fixed in location with respect to the support structure.

13. The handling device according to claim 11, wherein the further deflection element is designed as a deflection roller which is rotatable with respect to the support structure about a rotation axis which is at right angles to the main plane.

14. The handling device according to claim 1, wherein the release deflection element is biased into a gripping position by a spring force by way of a spring device, wherein it is movable relative to the support structure counter to the spring force into at least one release position which differs from the gripping position, by way of the release movement which is created by the release drive unit.

15. The handling device according to claim 1, wherein the release drive unit is designed in a manner such that a tensile force creating the release movement of the release deflection element is introduceable by the release drive unit into the adhesion tape wherein the adhesion tape is fixedly held in at least one of the holding regions.

16. The handling device according to claim 15, wherein the release drive unit comprises at least one drive motor which in one of the holding regions interacts with the adhesion tape for producing the tensile force.

17. A handling device according to claim 16, wherein the release drive unit in one of the holding regions comprises a brake which is designed for the releasable firm holding of the adhesion tape.

18. The handling device according to claim 1, wherein the release drive unit is drivingly coupled to the release deflection element independently of the adhesion tape for creating the release movement of the release deflection element.

19. The handling device according to claim 18, wherein the release deflection element is arranged in a stationary manner on a holding unit which is separate with respect to the support structure and which for creating the release movement of the release deflection element is mounted on the support structure in a manner moveable with respect to the support structure, wherein the release drive unit is arranged on the support structure and is drivingly coupled to the holding unit.

20. The handling device according to claim 19, wherein the holding unit is linearly displaceably mounted on the support structure.

21. The handling device according to claim 20, wherein the adhesion gripping device comprises several gripping units which are arranged on the support structure and which each comprise a separate working region through which a gripping section of an adhesion tape is passed and to which an individual release deflection element is assigned, wherein the adhesion gripping device comprises two gripping units which each comprise a holding unit which is equipped with a release deflection element, wherein the two holding units with regard to movement are synchronised with one another in a manner such that they are each movable to one another relative to the support structure for creating the release movements of the two release deflection elements.

22. The handling device according to claim 1, wherein the adhesion gripping device comprises an object support device which comprises at least one support element which is assigned to the working region and which is designed for supporting the object which is to be gripped or which is gripped.

23. The handling device according to claim 22, wherein at least one support element, whilst carrying out a linear travel movement relative to the support structure, is moveable up to the working region.

24. The handling device according to claim 1, further comprising the positioning device wherein the adhesion gripping device is fastened to the positioning device via its fastening interface.

25. A handling device for repositioning objects with an adhesion gripping device which comprises a support structure, on which a fastening interface for fastening the adhesion gripping device to a positioning device is formed, by way of which positioning device the adhesion gripping device is movable and positionable whilst carrying out a handling movement, with at least one gripping unit which is arranged on the support structure and which comprises a supple adhesion tape which extends in a main plane of the adhesion gripping device between two holding regions which are distanced to one another, at least on one side comprises an adhesion surface and has a longitudinal section, said longitudinal section being passed through a working region of the gripping unit and forming a gripping section by way of which an object to be repositioned can be gripped and firmly held in a releasable manner in the working region by way of an adhesion action of the adhesion surface wherein the adhesion gripping device comprises a release device which is designed for releasing an object which is gripped by the gripping section of the adhesion tape, said release device comprising at least one release deflection element which is arranged in the working region of the gripping unit, is partially wrapped by the adhesion tape and is translationally movable relative to the support structure in the main plane for carrying out a release movement, and further comprising a release drive unit which is arranged on the support structure and by way of which a circulating movement of the gripping section around the release deflection element can be created, said circulating movement being accompanied by the release movement of the release deflection element and effecting an active pulling-away of the adhesion tape from the gripped object, wherein the adhesion gripping device comprises several gripping units which are arranged on the support structure and which each comprise a separate working region through which a gripping section of an adhesion tape is passed and to which an individual release deflection element is assigned, and wherein an adhesion tape which runs between two holding regions of the support structure is commonly assigned to several gripping units of the adhesion gripping device, wherein the adhesion tape has several gripping sections formed by longitudinal sections of one and the same adhesion tape, which are distanced to one another and is passed through the working region of each of the several gripping units with one of the several gripping sections.

26. A handling device for repositioning objects with an adhesion gripping device which comprises a support structure, on which a fastening interface for fastening the adhesion gripping device to a positioning device is formed, by way of which positioning device the adhesion gripping device is movable and positionable whilst carrying out a handling movement, with at least one gripping unit which is arranged on the support structure and which comprises a supple adhesion tape which extends in a main plane of the adhesion gripping device between two holding regions which are distanced to one another, at least on one side comprises an adhesion surface and has a longitudinal section, said longitudinal section being passed through a working region of the gripping unit and forming a gripping section by way of which an object to be repositioned can be gripped and firmly held in a releasable manner in the working region by way of an adhesion action of the adhesion surface wherein the adhesion gripping device comprises a release device which is designed for releasing an object which is gripped by the gripping section of the adhesion tape, said release device comprising at least one release deflection element which is arranged in the working region of the gripping unit, is partially wrapped by the adhesion tape and is translationally movable relative to the support structure in the main plane for carrying out a release movement, and further comprising a release drive unit which is arranged on the support structure and by way of which a circulating movement of the gripping section around the release deflection element can be created, said circulating movement being accompanied by the release movement of the release deflection element and effecting an active pulling-away of the adhesion tape from the gripped object, wherein the release drive unit is drivingly coupled to the release deflection element independently of the adhesion tape for creating the release movement of the release deflection element, and wherein the release deflection element is arranged in a stationary manner on a holding unit which is separate with respect to the support structure and which for creating the release movement of the release deflection element is mounted on the support structure in a manner moveable with respect to the support structure, wherein the release drive unit is arranged on the support structure and is drivingly coupled to the holding unit.

27. A handling device for repositioning objects with an adhesion gripping device which comprises a support structure, on which a fastening interface for fastening the adhesion gripping device to a positioning device is formed, by way of which positioning device the adhesion gripping device is movable and positionable whilst carrying out a handling movement, with at least one gripping unit which is arranged on the support structure and which comprises a supple adhesion tape which extends in a main plane of the adhesion gripping device between two holding regions which are distanced to one another, at least on one side comprises an adhesion surface and has a longitudinal section, said longitudinal section being passed through a working region of the gripping unit and forming a gripping section by way of which an object to be repositioned can be gripped and firmly held in a releasable manner in the working region by way of an adhesion action of the adhesion surface wherein the adhesion gripping device comprises a release device which is designed for releasing an object which is gripped by the gripping section of the adhesion tape, said release device comprising at least one release deflection element which is arranged in the working region of the gripping unit, is partially wrapped by the adhesion tape and is translationally movable relative to the support structure in the main plane for carrying out a release movement, and further comprising a release drive unit which is arranged on the support structure and by way of which a circulating movement of the gripping section around the release deflection element can be created, said circulating movement being accompanied by the release movement of the release deflection element and effecting an active pulling-away of the adhesion tape from the gripped object, wherein the release drive unit is designed in a manner such that a tensile force creating the release movement of the release deflection element is introduceable by the release drive unit into the adhesion tape wherein the adhesion tape is fixedly held in at least one of the holding regions, and wherein the release drive unit comprises at least one drive motor which in one of the holding regions interacts with the adhesion tape for producing the tensile force, and wherein the release drive unit in one of the holding regions comprises a brake which is designed for the releasable firm holding of the adhesion tape.

* * * * *